US012367455B2

(12) United States Patent
Sekine et al.

(10) Patent No.: US 12,367,455 B2
(45) Date of Patent: Jul. 22, 2025

(54) MEMBER ATTACHMENT SUPPORT SYSTEM AND MEMBER ATTACHMENT SUPPORT METHOD

(71) Applicant: Mitsubishi Power, Ltd., Kanagawa (JP)

(72) Inventors: Susumu Sekine, Yokohama (JP); Hyota Abe, Yokohama (JP); Yutaka Kano, Yokohama (JP); Taiichi Mure, Yokohama (JP); Tomoyuki Yamazaki, Tokyo (JP); Toshiyuki Wada, Tokyo (JP); Hiroto Akitaya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1099 days.

(21) Appl. No.: 17/259,266

(22) PCT Filed: Jun. 26, 2019

(86) PCT No.: PCT/JP2019/025357
§ 371 (c)(1),
(2) Date: Jan. 11, 2021

(87) PCT Pub. No.: WO2020/039737
PCT Pub. Date: Feb. 27, 2020

(65) Prior Publication Data
US 2021/0279673 A1  Sep. 9, 2021

(30) Foreign Application Priority Data

Aug. 22, 2018 (JP) .................................. 2018-155362
Nov. 26, 2018 (JP) .................................. 2018-220349

(51) Int. Cl.
*G06Q 10/087* (2023.01)
*B23P 21/00* (2006.01)
(Continued)

(52) U.S. Cl.
CPC ............ *G06Q 10/087* (2013.01); *B23P 21/00* (2013.01); *G05B 19/4183* (2013.01);
(Continued)

(58) Field of Classification Search
CPC ....... G06Q 10/087; G06Q 50/04; B23P 21/00; B23P 2700/13; G05B 19/4183;
(Continued)

(56) References Cited

U.S. PATENT DOCUMENTS 5,453,933 A     9/1995   Wright et al.
8,326,707 B2 * 12/2012   Fan ...................... G06Q 10/087
                                                  235/382

(Continued)

FOREIGN PATENT DOCUMENTS

CN     107423650    12/2017
EP     1 923 823    11/2010
(Continued)

OTHER PUBLICATIONS

International Search Report issued Sep. 3, 2019 in International (PCT) Application No. PCT/JP2019/025357 with English-language translation.
(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

A member attachment support system is for supporting work of attaching a plurality of members to a device. The member attachment support system includes: an identification information storage unit provided for each of the plurality of members and configured to store identification information associated with an attachment position of each of the plurality of members; a terminal device configured to acquire
(Continued)

the identification information from the identification information storage unit; and a display device configured to display a support image that indicates the attachment position corresponding to the identification information acquired by the terminal device.

18 Claims, 15 Drawing Sheets

(51) Int. Cl.
  *G05B 19/418* (2006.01)
  *G06Q 50/04* (2012.01)
  *G06K 19/07* (2006.01)
(52) U.S. Cl.
  CPC .......... *G06Q 50/04* (2013.01); *B23P 2700/13* (2013.01); *G06K 19/0723* (2013.01)
(58) Field of Classification Search
  CPC ........... G05B 2219/31027; G05B 2219/37439; G05B 19/41805; G06K 19/0723; G06F 3/14; Y02P 90/02; F02C 7/24; F02C 7/00; G06T 11/00; G06T 11/60; F05D 2230/51; F05D 2230/60; F01D 25/145; F01D 25/00; F01D 25/14; F16L 59/00; F16L 59/12; F10D 25/08
  See application file for complete search history.

(56) References Cited

U.S. PATENT DOCUMENTS

| | | | | |
|---|---|---|---|---|
| 8,938,886 | B2 | 1/2015 | Ross et al. | |
| 2007/0229268 | A1* | 10/2007 | Swan | ..................... G08B 21/24 340/572.1 |
| 2008/0125950 | A1* | 5/2008 | Brown | ..................... F02C 9/00 477/30 |
| 2012/0290591 | A1* | 11/2012 | Flynn | ................. G06F 16/5866 707/754 |
| 2013/0293355 | A1* | 11/2013 | Christopher | ....... G06K 7/10376 340/10.1 |
| 2014/0236450 | A1* | 8/2014 | Care | ..................... F01D 5/027 701/100 |
| 2016/0358324 | A1 | 12/2016 | Sugimoto et al. | |
| 2019/0304150 | A1* | 10/2019 | Zweigle | ................. G06T 7/521 |

FOREIGN PATENT DOCUMENTS

| | | |
|---|---|---|
| JP | 5-278806 | 10/1993 |
| JP | 2000-24849 | 1/2000 |
| JP | 2005-222165 | 8/2005 |
| JP | 2007-87249 | 4/2007 |
| JP | 2008-1481 | 1/2008 |
| JP | 2009-037416 | 2/2009 |
| JP | 2016-221671 | 12/2016 |
| TW | 475911 | 2/2002 |
| WO | 2015/063884 | 5/2015 |

OTHER PUBLICATIONS

International Preliminary Report on Patentability issued Sep. 3, 2019 in International (PCT) Application No. PCT/JP2019/025357, with English-language translation.

* cited by examiner (a)

| P1 | P2 | P3 | P4 | P5 |
|---|---|---|---|---|
| P6 | P7 | P8 | P9 | P10 |
| P11 | P12 | P13 | P14 | P15 |
| P16 | P17 | P18 | P19 | P20 |
| ... | ... | ... | ... | ... |

(b)

| ATTACHMENT POSITION INFORMATION | STORAGE LOCATION INFORMATION | ATTACHMENT ORDER |
|---|---|---|
| NO. 11 OF AREA a | P8 | 1 |
| NO. 12 OF AREA a | P17 | 2 |
| NO. 13 OF AREA a | P11 | 3 |
| ... | ... | ... |

FIG. 11

MEMBER ATTACHMENT SUPPORT SYSTEM AND MEMBER ATTACHMENT SUPPORT METHOD

CROSS-REFERENCE TO RELATED APPLICATIONS

This application claims priority based on Japanese Patent Application No. 2018-155362 filed on Aug. 22, 2018 and Japanese Patent Application No. 2018-220349 filed on Nov. 26, 2018, the contents of which are incorporated herein by reference.

TECHNICAL FIELD

The present disclosure relates to a member attachment support system and a member attachment support method.

BACKGROUND ART

High-temperature and high-pressure gas flows inside components of a gas turbine (compressor, combustor, turbine, and the like). These components are covered with a heat insulating member using a heat resistant insulating material or the like to prevent heat dissipation when the gas turbine operates. For example, a heat insulation method in which a block-like heat insulating member (heat insulating block) is spread on the casing surface of each component has been suggested. One work process in the manufacturing process of the gas turbine involves attaching the heat insulating block to the casing surface. In some cases, piping is laid on the casing surface or the casing surface is uneven. Because of this, the surface of the casing cannot be effectively covered by simply attaching a uniform heat insulating block. Accordingly, the shape of the heat insulating block is adjusted according to the attachment position, and the attachment position of each heat insulating block is determined in advance. The heat insulating block plays an important role in terms of safety and performance, and a worker is required to attach the heat insulating block to an appropriate position.

JP 2000-24849 A describes, in the context of manufacturing of a high-temperature device, a technique for managing assembly work by applying a sticker provided with a serial number on each of a plurality of turbine blades in a work process of assembling the turbine blades to a disk in a radial manner. JP 2000-24849 A describes that, with the application of the stickers, the turbine blades are more easily identified, the turbine blades can be assembled to appropriate positions without error, and work efficiency is improved.

SUMMARY OF INVENTION

Technical Problem

During a periodic inspection, the heat insulating block is temporarily removed from the casing surface. When inspection work is completed, the heat insulating block is attached to its original position again. At present, a worker performs attaches the heat insulating block that has been temporarily removed while confirming the attachment position in drawings. The same applies to a case where a gas turbine is newly manufactured. In the attachment of such a heat insulating block, much time and effort is spent on work for finding the attachment position. There is a need for a method of efficiently recognizing an attachment position while achieving a reduction in work time and improvement of work efficiency during a periodic inspection.

The present disclosure provides a member attachment support system and a member attachment support method capable of solving the above-described problems.

Solution to Problem

According to an aspect of the present disclosure, a member attachment support system that supports a work of attaching a plurality of members to a device includes: an identification information storage unit provided for each of the plurality of members and configured to store identification information associated with an attachment position of each of the plurality of members; a terminal device configured to acquire the identification information from the identification information storage unit; and a display device configured to display a support image indicating an attachment position on the device corresponding to the identification information acquired by the terminal device.

According to the aspect of the present disclosure, the identification information includes area information indicating a predetermined work area on the device.

According to the aspect of the present disclosure, the identification information includes partition information in the work area.

According to the aspect of the present disclosure, the display device displays each of the attachment positions on the device in a different form depending on the work area.

According to the aspect of the present disclosure, the member attachment support system further includes: a management unit configured to record that each of the plurality of members is attached to the attachment position corresponding to the identification information.

According to the aspect of the present disclosure, in the member attachment support system, a latest progress of the work performed by another worker is displayed on the display device based on the record of the management unit.

According to the aspect of the present disclosure, the member attachment support system includes: a plurality of the identification information storage units; one or a plurality of the terminal devices; a server device configured to acquire the identification information from the terminal device and generate the support image; and the display device configured to allow a plurality of workers to view the display device simultaneously.

According to the aspect of the present disclosure, the member attachment support system includes: a plurality of the identification information storage units; and a plurality of the terminal devices, and at least one of the plurality of terminal devices generates the support image and transmits the support image to the remaining plurality of terminal devices.

According to the aspect of the present disclosure, the member attachment support system further includes: a storage location storage unit configured to store a storage location of each of the plurality of members before the member is attached to the device, and the display device displays the storage location of the member before being attached to the device.

According to an aspect of the present disclosure, a member attachment support system that supports a work of attaching a plurality of members to a device includes: an identification information storage unit provided for each of the plurality of members and configured to store identification information associated with an attachment position of each of the plurality of members; a terminal device configured to acquire the identification information from the identification information storage unit; and a sound output device configured to output sound information indicating an attachment position on the device corresponding to the identification information acquired by the terminal device.

According to the aspect of the present disclosure, the identification information storage unit is an RFID tag.

According to the aspect of the present disclosure, the identification information storage unit is a member on which code information is displayed.

According to an aspect of the present disclosure, a member attachment support method that supports a work of attaching a plurality of members to a device includes: by a terminal device, acquiring identification information associated with an attachment position of each of the plurality of members from an identification information storage unit provided for each of a plurality of members and configured to store the identification information; and displaying a support image indicating an attachment position on the device corresponding to the identification information acquired by the terminal device.

Advantageous Effects of Invention

With the member attachment support system and the member attachment support method described above, it is possible to improve the efficiency of work of attaching a heat insulating member to a device.

BRIEF DESCRIPTION OF DRAWINGS

FIG. 11 is a diagram illustrating recording processing of a storage location of the heat insulating block according to the third embodiment of the present disclosure.

DESCRIPTION OF EMBODIMENTS

First Embodiment

Hereinafter, work of attaching heat insulating blocks according to a first embodiment of the present disclosure will be described referring to FIGS. 1 to 6.

Figure 1:
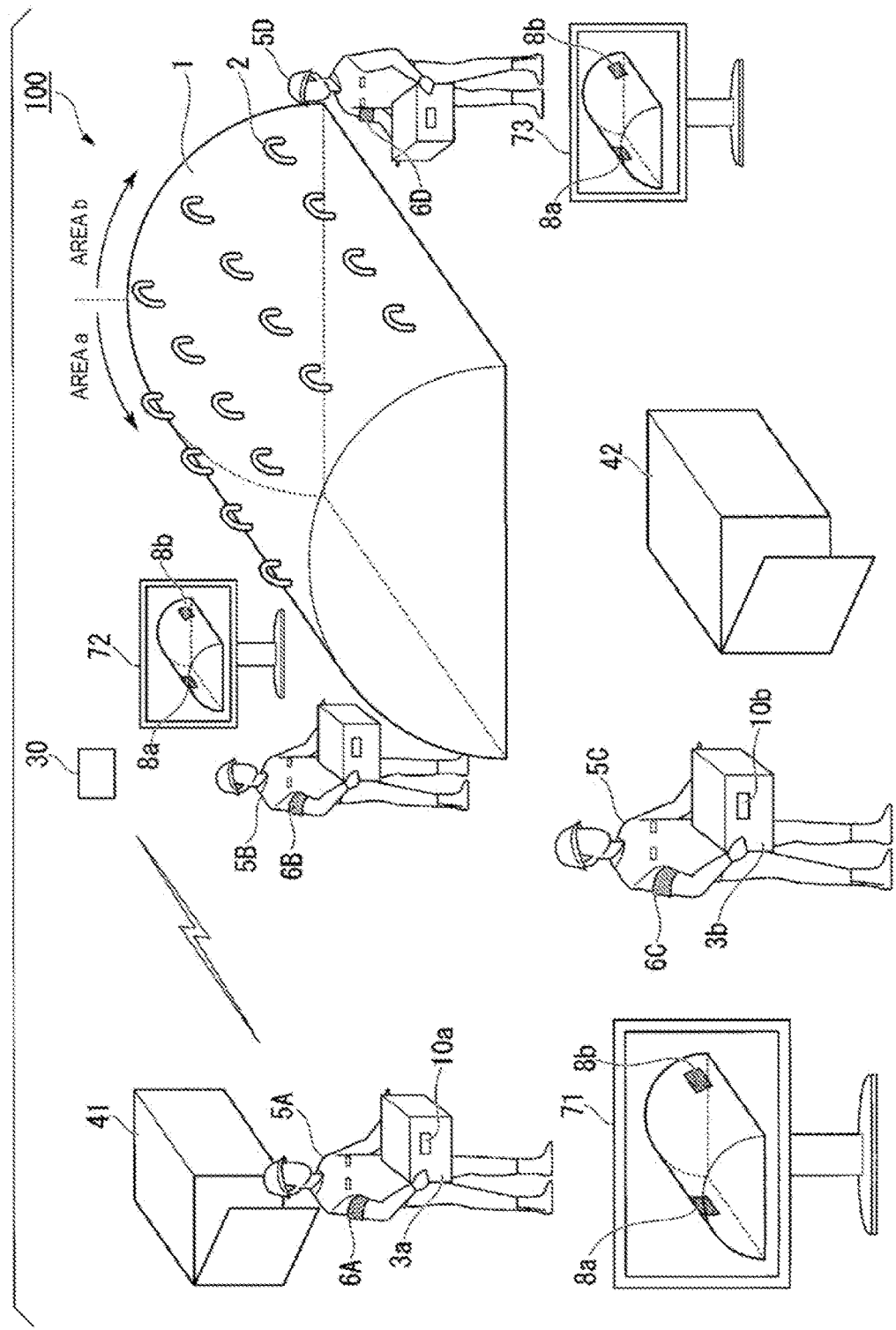
FIG. 1 is a schematic view of a member attachment support system in a first embodiment of the present disclosure.

FIG. 1 is a schematic view of a member attachment support system in the first embodiment of the present disclosure.

A member attachment support system 100 supports work in which workers 5A to 5D attach heat insulating blocks 3a and other components to cover a surface of a high-temperature device (compressor, combustor, turbine, or the like) constituting a gas turbine. A casing 1 illustrated in FIG. 1 is an example of the high-temperature device. In a case where there is no need for distinction between heat insulating blocks 3a and 3b, the heat insulating blocks 3a and 3b may simply be described as the heat insulating block 3. Similarly, the workers 5A to 5D may be described as the workers 5. Similarly, armbands 6A to 6D, attachment positions 8a and 8b, and radio frequency identifier (RFID) tags 10a and 10b may be described as armbands 6, attachment positions 8, and RFID tags 10, respectively.

A plurality of tools 2 for fixing the heat insulating blocks 3 are provided on a surface of the casing 1. As an example, the tools 2 are eye plates. The heat insulating block 3 is formed, for example, by filling a cubic bag with a laminate in which a heat insulating material and a metal plate are laminated. The bag is made of, for example, a glass cloth material made from woven glass fibers. On the surface of the heat insulating block 3, the RFID tag 10 is sewn to the glass cloth material. Information (attachment position information) regarding the position at which the heat insulating block 3 is to be attached is recorded in the RFID tag 10. A fixing tool (for example, a hook) (not illustrated) is provided on the surface of the heat insulating block 3. The worker 5 attaches the heat insulating block 3 to the surface of the casing 1 by hanging the hook on the tool 2. When the heat insulating blocks 3 are attached to all the tools 2, the surface of the casing 1 is covered with the heat insulating blocks. An appropriate attachment position for the heat insulating block 3 is determined. For this reason, the worker 5 needs to attach each heat insulating block 3 to each tool 2 at an appropriate position. The member attachment support system 100 supports attachment work of the heat insulating blocks 3 by indicating to the worker 5 the position at which the heat insulating block 3 is to be attached.

Attachment Support Function

Next, a flow of the attachment work of the heat insulating blocks 3 by the workers 5A to 5D will be described.

The casing 1 is large and the range of attaching the heat insulating blocks 3 is wide. Thus, the surface of the casing 1 is divided into a plurality of work areas, and one or a plurality of the workers 5 are responsible for each work area.

FIG. 1 illustrates an example of division into two work areas (an area a and an area b). The workers 5A and 5B are responsible for the area a, and the workers 5C and 5D are responsible for the area b. The worker 5A has the armband 6A mounted on an arm. Similarly, the workers 5B to 5D have armbands 6 (armbands 6B to 6D, respectively) mounted on arms. The armbands 6 are distinguished using different colors depending on the work area that the workers are responsible for. For example, the armbands (armbands 6A and 6B) of the workers 5A and 5B are red. On the other hand, the armbands (armbands 6C and 6D, respectively) of the workers 5C and 5D are blue.

The heat insulating blocks 3 that are to be attached to the area a are stored in a storage 41. The worker 5A performs work of carrying the heat insulating block 3 out from the storage 41. The worker 5B performs work of attaching the heat insulating block 3 that was carried out by the worker 5A to an appropriate position of the area a of the casing 1. On the other hand, the heat insulating blocks 3 that are to be attached to the area b are stored in a storage 42. The worker 5C performs work of carrying the heat insulating block 3 out from the storage 42. The worker 5D receives the heat insulating block 3 carried out by the worker 5C and performs work of attaching the heat insulating block 3 to an appropriate position of the area b.

An information processing terminal (not illustrated) (a terminal 20 in FIG. 2 described below) is provided on the armband 6. The terminal 20 is, for example, a mobile terminal, such as a smartphone, equipped with a display screen. The terminal 20 is fixed to the armband 6 such that the worker 5 can refer to the display screen. The display screen of the terminal 20 is equipped with an input function such as a touch panel. The terminal 20 has a function as an RFID reader. During the work of the worker 5, the function of the RFID reader is activated. Hereinafter, an information processing terminal that the worker 5A wears is referred to as a terminal 20A, and terminals that the other workers 5B to 5D wear are referred to as terminals 20B to 20D. In a case where there is no need for distinction among the terminals 20A to 20D, the terminals 20A to 20D are described as the terminals 20.

First, the worker 5A carries the heat insulating block 3a out from the storage 41. In this case, the terminal 20A and the RFID tag 10a mounted on the heat insulating block 3a approach, whereby the terminal 20A performs communication with the RFID tag 10a. The terminal 20A acquires the attachment position information stored in the RFID tag 10a and transmits the attachment position information to a server device 30.

Similarly, the worker 5C carries the heat insulating block 3b out from the storage 42. In this case, the terminal 20C provided on the armband 6C of the worker 5C acquires the attachment position information from the RFID tag 10b of the heat insulating block 3b and transmits the attachment position information to the server device 30.

The server device 30 generates a support image that displays the attachment positions of the heat insulating blocks 3a and 3b on the casing 1 and transmits the generated support image to monitors 71 to 73 and the terminals 20A to 20D. The monitors 71 to 73 display the support image. The terminals 20 display the support image on the display screens. For example, as illustrated in the monitor 71, the attachment positions 8a and 8b are indicated in the support image along with the external shape of the casing 1. The attachment position 8a indicates the attachment position of the heat insulating block 3a, and the attachment position 8b indicates the attachment position of the heat insulating block 3b. The attachment positions 8a and 8b are displayed in different colors to distinguish the attachment positions of the heat insulating blocks 3a and 3b. For example, the attachment position 8a (area a) of the heat insulating block 3a that the workers 5A and 5B are responsible for is displayed in red. The attachment position 8b (area b) of the heat insulating block 3b that the workers 5C and 5D are responsible for is displayed in blue. The workers 5A and 5B can recognize the attachment position of the heat insulating block 3a by the display position of the attachment position 8a having the same color as the color of the armbands of the workers 5A and 5B. Similarly, the workers 5C and 5D can recognize the attachment position of the heat insulating block 3b by the display position of the attachment position 8b being displayed in the same color as the color of the armbands of the workers 5C and 5D.

Next, the worker 5A delivers the carried heat insulating block 3a to the worker 5B. The worker 5B attaches the heat insulating block 3a to the attachment position 8a of the area a with reference to the support image displayed on the monitor 72 or the terminal 20B. On the other hand, the worker 5C delivers the carried heat insulating block 3b to the worker 5D. The worker 5D attaches the heat insulating block 3b to the attachment position 8b of the area b with reference to the support image displayed on the monitor 73 or the terminal 20D.

A division of labor system is established in which different workers 5 are responsible for the work of carrying the heat insulating blocks 3 out from the storages 41 and 42 and the work of attaching the heat insulating blocks 3 to the casing 1, and this system can improve work efficiency. However, one worker 5A may perform the work of detaching the heat insulating block 3 from the storage 41 and attaching the heat insulating block 3 to the area a. In regard to the area b, for example, the worker 5C may perform the work of detaching the heat insulating block 3 from the storage 42 and attaching the heat insulating block 3 to the appropriate position of the area b.

With the member attachment support system 100, the workers 5A to 5D can easily recognize the attachment positions of the heat insulating blocks 3 with reference to the support image displayed on the monitors 71 to 73 or the display screens of the terminals 20 provided on the armbands 6 of the workers 5A to 5D. With this, it is possible to reduce work time and improve work efficiency.

Progress Management Function

In a case where the heat insulating block 3a is attached to the attachment position 8a, the worker 5B inputs attachment completion information to the terminal 20B. The terminal 20B transmits the attachment completion information of the heat insulating block 3a to the server device 30. The server device 30 stores that the attachment work of the heat insulating block 3a is completed and that the worker 5B performs the attachment work. The server device 30 generates a support image reflecting the completion of the attachment of the heat insulating block 3a. The server device 30 transmits the generated support image to the monitors 71 to 73 and the terminals 20A to 20D. In the newly generated support image, for example, a portion of the attachment position 8a is updated from red to gray indicating the completion of the work. As a result, the worker 5 can confirm the progress status of the attachment work. For example, the workers 5C and 5D who are responsible for the area b can confirm the progress of the work by the workers 5A and 5B. The server device 30 stores that the worker 5B has performed the attachment work of the heat insulating block 3a. A work history is aggregated for each worker 5, making it possible to manage work results of the workers 5.

Next, the configuration and function of the member attachment support system 100 will be described.

Figure 2:
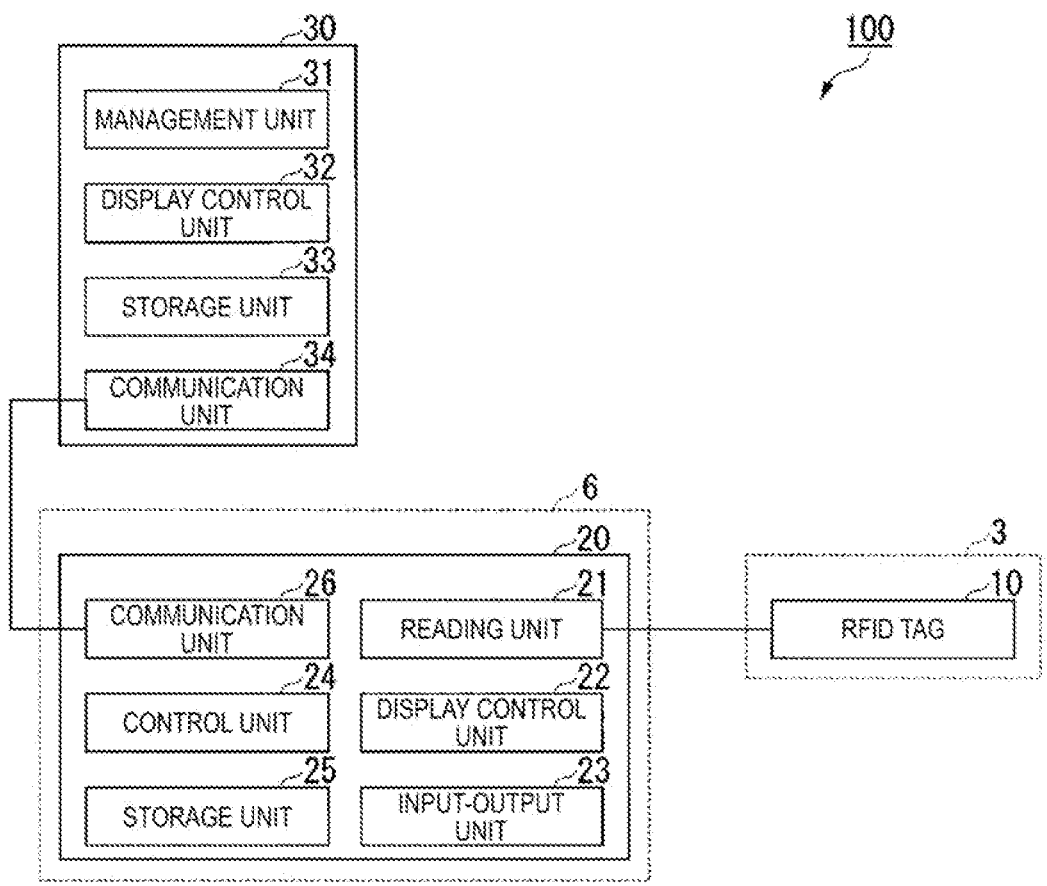
FIG. 2 is a first block diagram illustrating an example of the member attachment support system in the first embodiment of the present disclosure.

FIG. 2 is a first block diagram illustrating an example of the member attachment support system in the first embodiment of the present disclosure.

The member attachment support system 100 includes the RFID tag 10 provided on the heat insulating block 3, the terminal 20 provided on the armband 6, and the server device 30. The member attachment support system 100 may further include a plurality of RFID tags 10 and a plurality of terminals 20.

The RFID tag 10 stores the attachment position information of the heat insulating block 3 on which the RFID tag 10 is mounted. The attachment position information is information including, for example, "No. 11 of the area a". The area a is the work area (area information) illustrated in FIG. 1. No. 11 is identification information of a section of the attachment position of the heat insulating block 3 uniquely set in the area a. The RFID tag 10 is a passive tag. The RFID tag 10 is activated with power feed by the terminal 20 and communicates with the terminal 20. The RFID tag 10 transmits the attachment position information including "No. 11 of the area a" or the like to the terminal 20 through this communication. The attachment position information includes area information and partition information. For example, in a case where the attachment position 8a in FIG. 1 is displayed in red, red indicates the "area a", and a position where the attachment position 8a is displayed indicates "No. 11". That is, red corresponds to the area information, and the attachment position 8a corresponds to the partition information.

The terminal 20 includes a reading unit 21, a display control unit 22, an input-output unit 23, a control unit 24, a storage unit 25, and a communication unit 26.

The reading unit 21 activates the RFID tag 10 with induced electromotive force and communicates with the RFID tag 10 through wireless communication, such as Near Field Communication (NFC). The reading unit 21 acquires the attachment position information stored in the RFID tag 10 through communication.

The display control unit 22 generates an image to be displayed on the display screen of the terminal 20. For example, the display control unit 22 generates an image in which buttons used for managing the progress of the attachment work, such as "activate", "complete", and "release" are displayed.

The input-output unit 23 performs an input and an output with respect to the terminal 20. For example, the input-output unit 23 includes a display screen, such as a liquid crystal display, on which the image generated by the display control unit 22 is displayed, and hardware buttons provided on the terminal 20. The display screen is provided with a touch panel that detects contact of a finger, and the input-output unit 23 receives information input by the worker 5 through the touch panel.

The control unit 24 controls the operation of the terminal 20 based on an operation performed by the worker 5 through the input-output unit 23. For example, in a case where the worker 5 depresses the "activate" button displayed on the display screen, the control unit 24 activates the reading unit 21. In a case where the worker 5 depresses the "complete" button displayed on the display screen, completion of the attachment work of the heat insulating block 3 is transmitted to the server device 30 through the communication unit 26.

The storage unit 25 stores various kinds of information.

The communication unit 26 communicates with the server device 30 or other terminals 20 over a wireless local area network (LAN) or the like.

Hereinafter, functional units provided in the terminal 20A are described as a reading unit 21A, a display control unit 22A, an input-output unit 23A, a control unit 24A, a storage unit 25A, and a communication unit 26A. The same applies to the terminals 20B to 20D.

The server device 30 includes a management unit 31, a display control unit 32, a storage unit 33, and a communication unit 34.

The management unit 31 records the attachment position of the heat insulating block 3, the attachment work of which is completed, in the storage unit 33.

The display control unit 32 generates a support image to be displayed on the monitors 71 to 73 and the like.

The storage unit 33 stores an external shape image of the casing 1, information of the attachment positions of the heat insulating blocks 3 on the surface of the casing 1, and the like. For example, the storage unit 33 stores that "No. 11 of the area a" corresponds to the attachment position 8a (FIG. 1) of the casing 1.

The communication unit 34 communicates with the terminal 20 or the monitors 71 to 73 over a wireless local area network (LAN).

Next, a flow of processing of the member attachment support system 100 will be described in order of the operations of the workers 5A and 5B described referring to FIG. 1.

Figure 3:
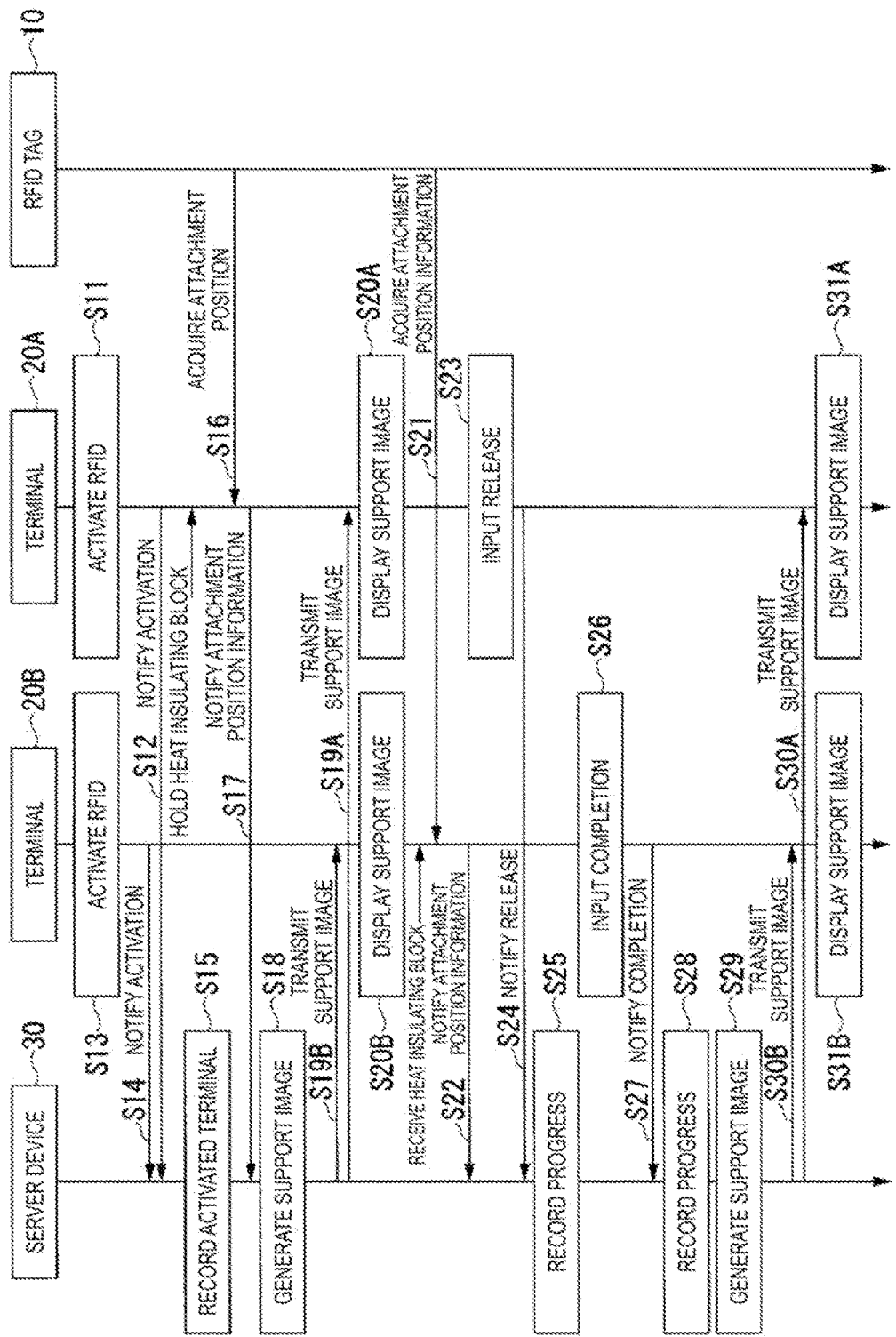
FIG. 3 is a flowchart illustrating an example of the operation of the member attachment support system in the first embodiment of the present disclosure.

FIG. 3 is a flowchart illustrating an example of the operation of the member attachment support system in the first embodiment of the present disclosure.

It is assumed that an application for use in the attachment work is activated in the terminal 20. The application displays buttons on which, for example, text such as "activate", "complete", and "release", is displayed, and the support image on the display screen of the terminal 20.

First, the worker 5A depresses the "activate" button on the display screen of the terminal 20A. Then, the control unit 24A activates the reading unit 21A (RFID function) (Step S11). The control unit 24A notifies the server device 30 of the activation of the reading unit 21A through the communication unit 26A (Step S12). The activation notification of the reading unit 21A includes identification information of the terminal 20A.

Similarly, the worker 5B depresses the "activate" button on the display screen of the terminal 20B. Then, the control unit 24B activates the reading unit 21B (RFID function) (Step S13). The control unit 24B notifies the server device 30 of the activation of the reading unit 21B through the communication unit 26B (Step S14). The activation notification of the reading unit 21B includes identification information of the terminal 20B.

In the server device 30, the management unit 31 receives the activation notification of the reading units 21A and 21B through the communication unit 34. The management unit 31 records the identification information of the terminals 20A and 20B from which the activation of the RFID function is notified and a reception time of the activation notification (Step S15). With this record, it is possible to manage the workers 5 who participate in the attachment work. A correspondence relationship of the terminal 20A, the worker 5A, and the work area (area a) and a correspondence relationship of the terminal 20B, the worker 5B, and the area a are registered in the storage unit 33 of the server device 30. The storage unit 33 registers that the worker 5A performs the work of carrying out the heat insulating block, and the worker 5B performs the work of attaching the heat insulating block.

Next, the worker 5A selects the heat insulating block 3 to be attached next in the storage 41 and carries out the selected heat insulating block 3. In this case, the reading unit 21A acquires the attachment position information from the RFID tag 10 of the selected heat insulating block 3 (Step S16). The reading unit 21A outputs the acquired attachment position information to the control unit 24A. The control unit 24A transmits the attachment position information to the server device 30 through the communication unit 26A along with the identification information of the terminal 20A (Step S17). The attachment position information includes information regarding the work area (area information) and the partition information indicating the attachment position in the work area.

In the server device 30, the display control unit 32 receives the notification of the attachment position information through the communication unit 34. The display control unit 32 generates the support image in which the attachment position information (for example, the attachment position 8a) acquired from the terminal 20A is displayed on the casing 1 (Step S18). The display control unit 32 generates the support image in which the attachment position 8a is displayed in red. The display control unit 32 transmits the support image to the monitors 71 to 73 or the terminals 20A and 20B through the communication unit 34 (Steps S19A and S19B).

The monitors 71 to 73 and the terminals 20A and 20B display the support image (Steps S20A and S20B). The workers 5A and 5B confirm the attachment position of the heat insulating block 3 with reference to the support image displayed on the monitors 71 to 73 and the display screens of the terminals 20 of the individual workers 5A and 5B.

In the server device 30, the management unit 31 records the identification information of the terminal 20A and the attachment position information in the storage unit 33 along with a reception time of the information. With this, it is possible to record a work history indicating that the worker 5A has carried out the heat insulating block 3.

Next, the worker 5A delivers the carried heat insulating block 3 to the worker 5B. The worker 5B receives the heat insulating block 3. In this case, the reading unit 21B acquires the attachment position information from the RFID tag 10 of the received heat insulating block 3 (Step S21). The reading unit 21B outputs the acquired attachment position information to the control unit 24B. The control unit 24B transmits the attachment position information to the server device 30 through the communication unit 26B (Step S22).

In a case where the heat insulating block 3 is delivered, the worker 5A inputs, to the terminal 20A, information indicating that the heat insulating block 3 is released (is delivered to the worker 5B) (Step S23). For example, the worker 5A depresses the "release" button on the display screen. Then, the control unit 24A notifies the server device 30 of the release of the heat insulating block 3 along with the identification information of the terminal 20A through the communication unit 26A (Step S24).

In the server device 30, the management unit 31 records the identification information of the terminal 20A and the release notification in the storage unit 33 along with a reception time of the information. The management unit 31 records the identification information of the terminal 20B and the attachment position information in the storage unit 33 along with a reception time of the each information (Step S25). With this, it is possible to record a work history indicating that the worker 5A has delivered the heat insulating block 3 to the worker 5B.

In a case where the worker 5B confirms the attachment position of the heat insulating block 3 with reference to the monitor 72 or the display screen of the terminal 20B, the worker 5B attaches the heat insulating block 3 to the position indicated by the support image. When the attachment work is completed, the worker 5B inputs, to the terminal 20B, information indicating that the attachment of the heat insulating block 3 is completed (Step S26). For example, the worker 5B depresses the "complete" button on the display screen. The control unit 24B notifies the server device 30 of the attachment completion of the heat insulating block 3 along with the identification information of the terminal 20B through the communication unit 26B (Step S27).

In the server device 30, the management unit 31 records the identification information of the terminal 20B and the completion notification in the storage unit 33 along with a reception time of the each information (Step S28). With this, it is possible to record a work history indicating the attachment completion of the heat insulating block 3 to the casing 1 by the worker 5B. When the attachment of the heat insulating block 3 is completed, the display control unit 32 generates a support image after the attachment completion (Step S29). The display control unit 32 generates a support image in which, for example, the attachment position of the heat insulating block 3 on the casing 1 is displayed in gray. The display control unit 32 transmits the support image to the monitors 71 to 73 and the terminals 20A and 20B through the communication unit 34 (Steps S30A and S30B).

The monitors 71 to 73 and the terminals 20A and 20B display the support image (Steps S31A and S31B). The workers 5A and 5B can confirm the position where the attachment work is performed, with reference to the support image displayed on the monitors 71 to 73 and the display screens of the terminals 20 of the individual workers 5A and 5B. A manager of the work can confirm the progress status of the attachment work.

In the flowchart of FIG. 3, the flow of the processing of the member attachment support system 100 based on the work performed by the workers 5A and 5B is described. However, in a case where the workers 5C and 5D perform the attachment work of the heat insulating block 3 to the area b in parallel with the above-described work, the member attachment support system 100 executes the same processing to display a support image in which an attachment status of the heat insulating blocks 3 in the areas a and b is displayed.

According to the present embodiment, even though the work of attaching the heat insulating block 3 is performed by a plurality of workers 5, the attachment work can be performed while all workers 5 share the progress status of the work. For example, the workers 5A and 5B can proceed with the attachment work for the area a while confirming the work status of the other workers 5C and 5D.

Next, priority of the attachment work of the heat insulating block 3 will be described.

Figure 4:
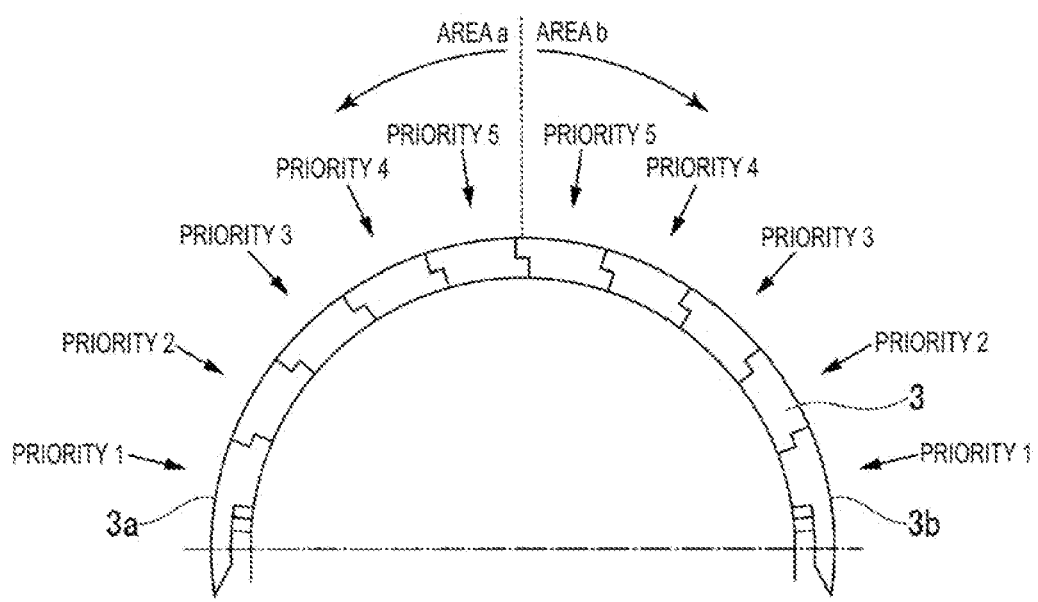
FIG. 4 is a diagram illustrating an example of an attachment position of a heat insulating block in the first embodiment of the present disclosure.

FIG. 4 is a diagram illustrating an example of the attachment position of the heat insulating block in the first embodiment of the present disclosure.

FIG. 4 is a cross-sectional view of the casing 1 illustrated in FIG. 1. Work efficiency is improved when the heat insulating blocks 3 are attached starting from the heat insulating block 3 to be attached to a lower position. Priority 1 to priority 5 are indicated in a descending order for the priority of the attachment work.

Figure 5:
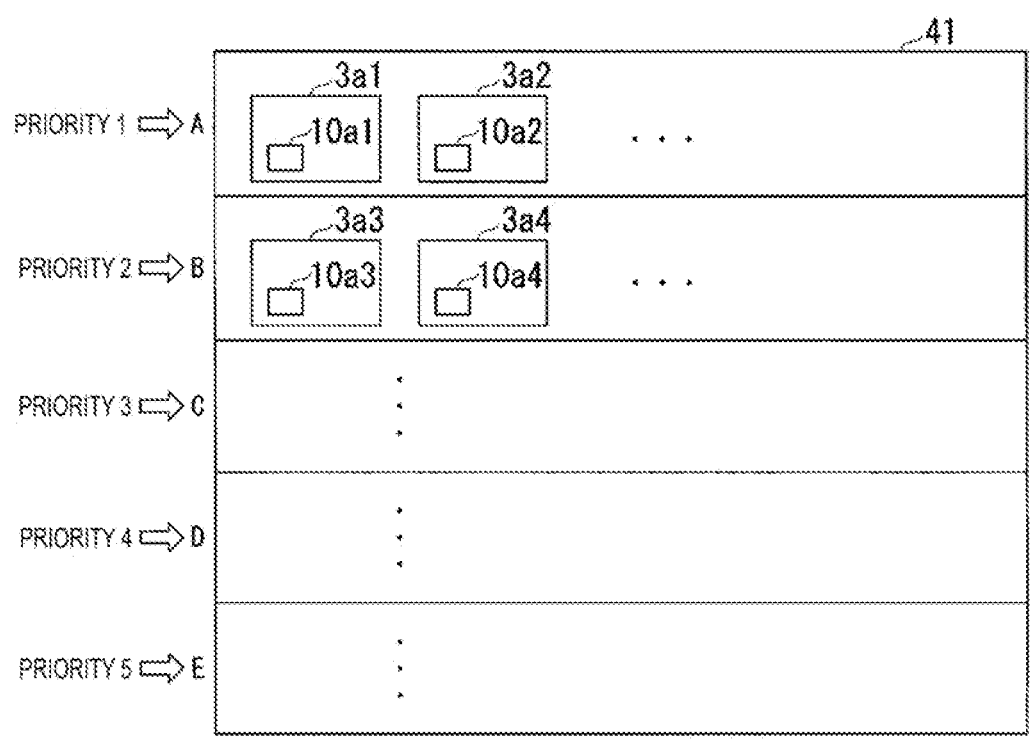
FIG. 5 is a diagram illustrating an example of a storage of the heat insulating block in the first embodiment of the present disclosure.

FIG. 5 is a diagram illustrating an example of a storage for the heat insulating blocks in the first embodiment of the present disclosure.

FIG. 5 illustrates a stored status of the heat insulating blocks 3 in the storage 41. A shelf A to a shelf E are provided in the storage 41. To attach the heat insulating blocks in the order of priority illustrated in FIG. 4, for example, the shelf A stores the heat insulating blocks 3 to be attached with the highest priority (priority 1). The heat insulating blocks 3 with the priority 2 are stored on the shelf B. Similarly, the shelf C stores the heat insulating blocks 3 with the priority 3, and the shelves D and E store the heat insulating blocks 3 with the priority 4 and 5, respectively. By storing the heat insulating blocks 3 in this manner, work efficiency can be improved.

For example, the worker 5A first carries out the heat insulating blocks 3 on the shelf A one at a time and delivers the heat insulating blocks 3 to the worker 5B. The worker 5B attaches all the heat insulating blocks 3 with the priority 1 in the area a of FIG. 4. When the shelf A is completed, the worker 5A then carries out the heat insulating blocks 3 on the shelf B and delivers the heat insulating blocks 3 to the worker 5B. The worker 5B attaches all the heat insulating blocks 3 with the priority 2 in the area a. The same applies to the priorities 3 to 5. In this manner, the worker 5B can attach the heat insulating blocks 3 in a descending order of the priority.

In a situation where the heat insulating blocks 3 are stored in the storage 41, it is desirable to store the heat insulating blocks 3 on each shelf based on priority. For example, in a periodic inspection or the like, all the heat insulating blocks 3 are detached and stored in the storages 41 and 42. After the end of the inspection work, the heat insulating blocks 3 are carried out from the storages 41 and 42 and are attached to the casing 1 again. In a situation where the heat insulating block 3 is detached, it is assumed that the worker 5B performs the work of detaching the heat insulating block 3 from the casing 1 and delivers the detached heat insulating block 3 to the worker 5A, and the worker 5A stores the heat insulating block 3 in the storage 41. Then, the worker 5B detaches the heat insulating block 3 in order from the heat insulating block 3 associated with the priority 5 in FIG. 4, for example, and delivers the heat insulating block 3 to the worker 5A. The worker 5A stores the received heat insulating block 3 on the shelf E. Next, the worker 5B detaches each heat insulating block 3 with the priority 4, and the worker 5A stores the heat insulating block 3 on the shelf D.

Hereinafter, similarly, the worker 5A stores the heat insulating block with the priority 3 on the shelf C, stores the heat insulating block with the priority 2 on the shelf B, and stores the heat insulating block with the priority 1 on the shelf A.

By storing the heat insulating blocks 3 are stored in this manner, the workers can efficiently perform attachment work when attaching the heat insulating blocks 3 to the casing 1 again after the inspection work. The periodic inspection is performed periodically, for example, once per year. The heat insulating blocks 3 are determined to be stored on different shelves A to E depending on the priority of the attachment work. As a result, it is possible to improve the efficiency of the work of detaching and storing the heat insulating blocks 3 and the work of carrying out and attaching the heat insulating blocks 3 even in the case of repetitive inspection work or the like.

The order in which the heat insulating blocks 3 are attached may be any order. However, from the viewpoint of work efficiency, it is desirable to attach the heat insulating blocks in the order described referring to FIG. 4. With the storing method described referring to FIG. 5, when the worker 5A carries out the heat insulating block 3, it is possible to decrease the effort required to find the heat insulating block 3 to be carried out with priority. The worker 5B can attach the heat insulating blocks 3 in an ideal order.

With the member attachment support system 100, since the (durable) RFID tag 10 is mounted on the heat insulating block 3, it is possible to display the support image for each inspection work to support the attachment work performed by the workers 5. Even when the RFID tag 10 malfunctions or the like, the RFID tag 10 storing appropriate attachment position information is mounted again on the heat insulating block 3, and thus it is possible to repeatedly use the member attachment support system 100.

When the heat insulating block 3 cannot be stored in the form illustrated in FIG. 5, the worker 5A can find and carry out the heat insulating block 3 with high priority using the member attachment support system 100. For example, when the worker 5A approaches the heat insulating block 3, the attachment position of the heat insulating block 3 is displayed on the monitor 71 or the display screen of the terminal 20A. When the priority illustrated in FIG. 4 is known, the worker 5A can confirm the priority of the heat insulating block 3 according to the attachment position of the heat insulating block 3 displayed in the support image. The worker 5A can select the heat insulating block 3 with high priority and deliver the selected heat insulating block 3 to the worker 5B.

Next, another configuration example of the member attachment support system according to the present embodiment will be illustrated.

Figure 6:
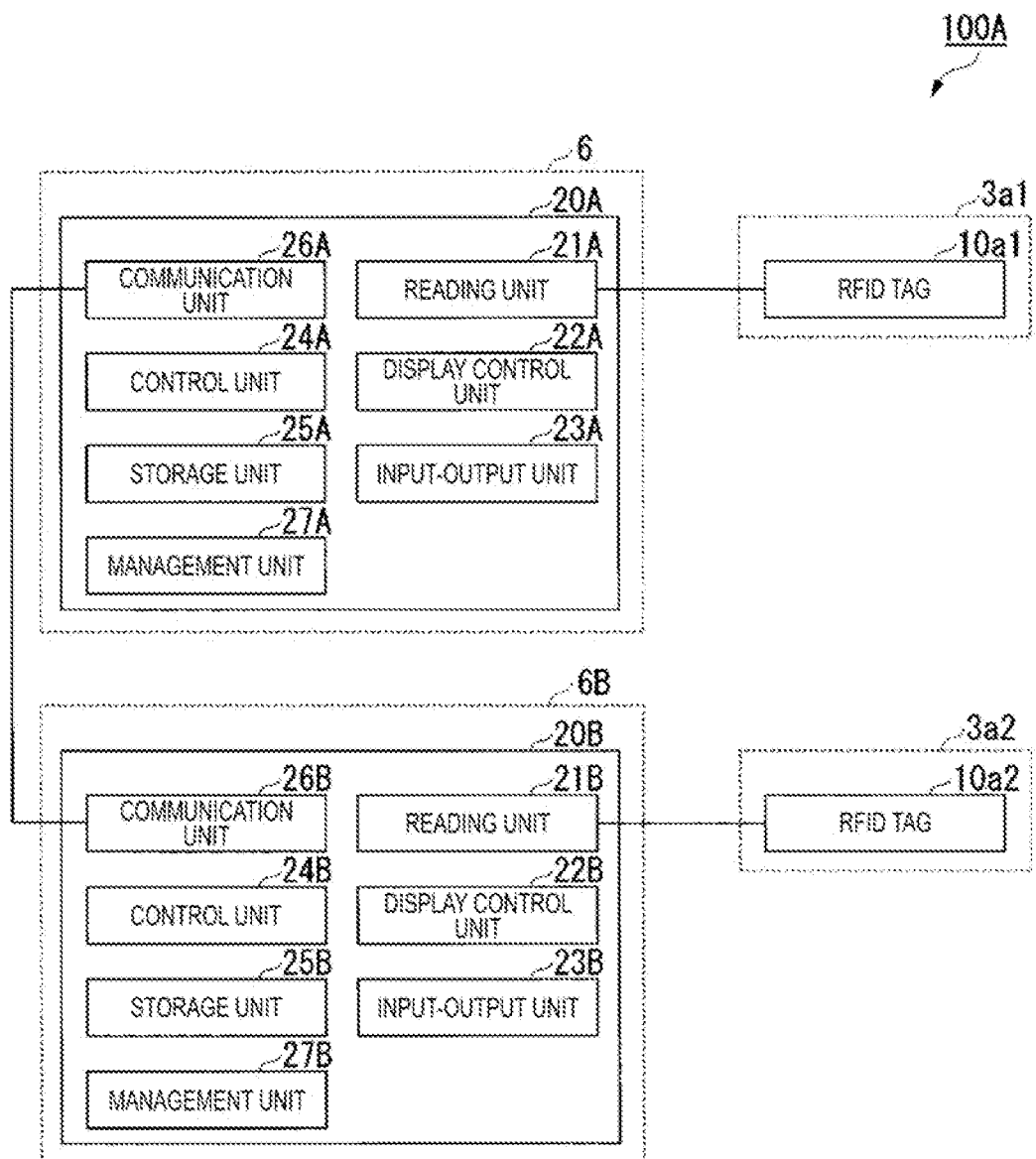
FIG. 6 is a second block diagram illustrating an example of the member attachment support system in the first embodiment of the present disclosure.

FIG. 6 is a second block diagram illustrating an example of the member attachment support system in the first embodiment of the present disclosure.

A member attachment support system 100A does not include the server device 30. Instead, the terminal 20 includes a management unit 27, and an attachment completion time or an attachment position of the heat insulating block 3 is recorded in the storage unit 25. The display control unit 22 generates a support image. For example, the terminal 20A may be used as a master device, and other terminals 20, such as the terminal 20B, may be used a slave device. The slave device, such as the terminal 20B, may perform notification of attachment position information acquired from the RFID tag 10 (Steps S17 and S22 in FIG. 3), release notification (Step S24 in FIG. 3), or completion notification (Step S27 in FIG. 3) to the terminal 20A, which is the master device, and the terminal 20A may generate a support image (Steps S18 and S29 in FIG. 3) or may record the progress (Steps S25 and S28 in FIG. 3) and may transmit the support image to the slave devices or the monitors 71 to 73. Alternatively, the respective terminals 20 may record the progress and may transmit results to be synchronized with one another, and the respective terminals 20 may generate the support image.

Even though the server device is not provided as described above, it is possible to realize the member attachment support system of the present embodiment.

In the above-described embodiment, although the monitors 71 to 73 are provided, the monitors 71 to 73 are not required. The processing in FIG. 3 may be executed by displaying the support image on the display screen (input-output unit 23) of the terminal 20. The support image may not be displayed on the display screen of the terminal 20, and the support image may be displayed only on the monitors 71 to 73. The terminal 20 may not include the display screen. The above-described functions may be realized by corresponding buttons (hardware) provided on the terminal 20 to "activate", "release", "complete" and the like described above.

In the above-described embodiment, the RFID tag 10 includes the attachment position information (area information and partition information). However, the identification information of the RFID tag 10 may be stored and the server device 30 may convert the identification information into the attachment position information.

Second Embodiment

Hereinafter, a member attachment support system according to a second embodiment of the present disclosure will be described referring to FIG. 7. In the first embodiment, an example where the worker 5 reads the attachment position information stored in the RFID tag 10 of the heat insulating block 3 using the terminal 20 provided on the armband 6 to confirm a specific location of the attachment position by using the monitor 71 or the like has been described. In the second embodiment, the terminal 20 is provided to be fixed in the vicinity of the monitor 71, for example, and the worker 5 holds the heat insulating block 3, moves to the location of the terminal 20, and causes a reading device (reading unit 21), such as an RFID reader or a barcode reader connected to the terminal 20, to read the attachment position information, and a result is displayed on the monitor 71 or the like.

Figure 7:
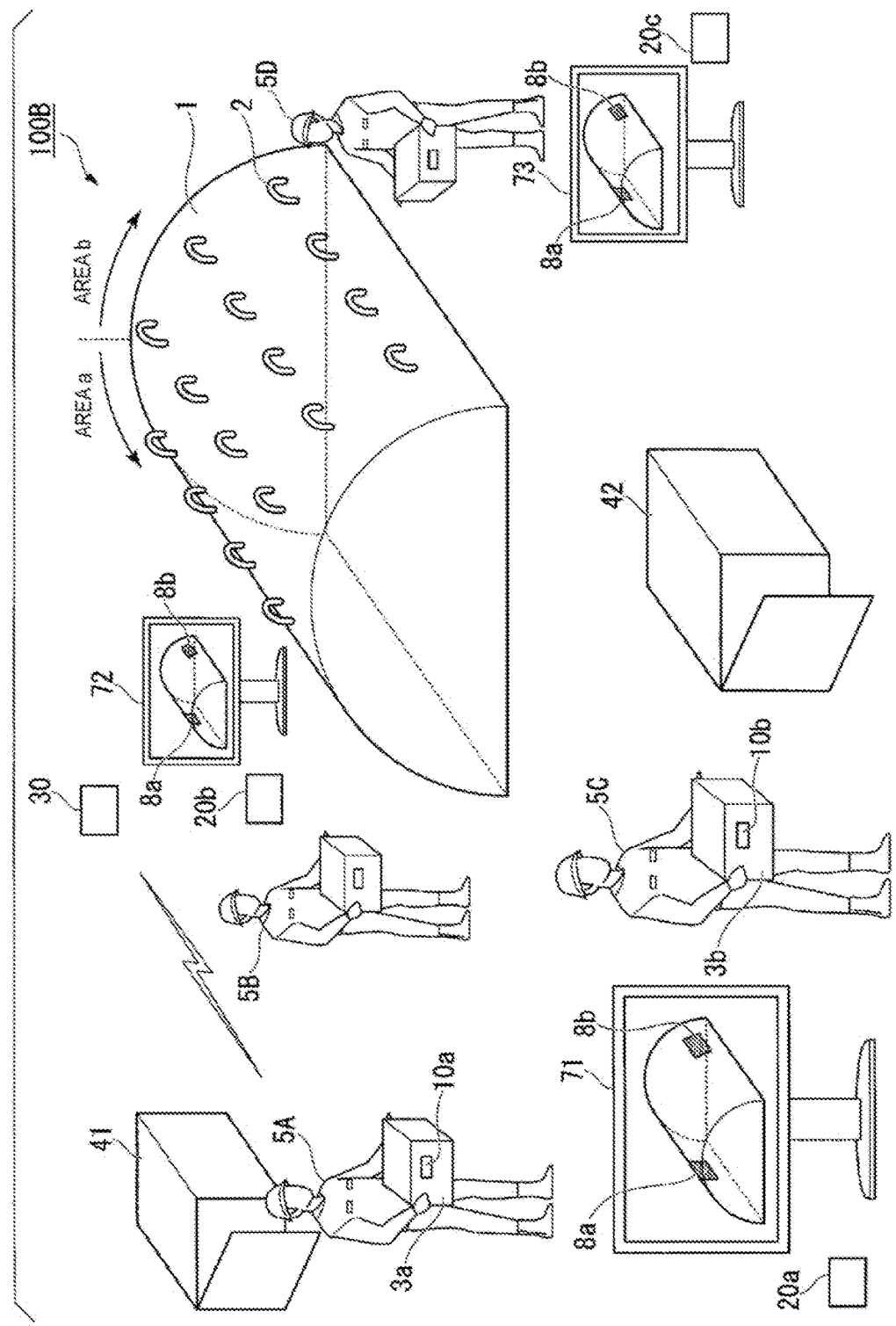
FIG. 7 is a schematic view of a member attachment support system in a second embodiment of the present disclosure.

FIG. 7 is a schematic view illustrating the member attachment support system in the second embodiment of the present disclosure.

In the configuration of a member attachment support system 100B according to the second embodiment of the present disclosure, the same components as the functional units constituting the member attachment support system 100 according to the first embodiment of the present disclosure are represented by the same reference signs, and description of these components will not be repeated. In the member attachment support system 100B of the present embodiment, the terminals 20 are provided to be fixed at predetermined positions and not on the armbands 6 of the workers 5A to 5D. For example, terminals 20a, 20b, and 20c are provided near the monitors 71, 72, and 73, respectively. The terminals 20a to 20c may be mobile terminals, such as smartphones, as in the first embodiment or may be configured of stationary computers, such as personal computers (PCs). Although the functional units provided in the terminals 20a to 20c are the same as those described referring to FIG. 2 RFID readers or barcode readers, for example, may be connected to the terminals 20a to 20c to constitute reading units 21a to 21c. Keyboards and mouses (not illustrated) and the monitors 71 to 73 may be connected to the terminals 20a to 20c and may constitute input-output units 23a to 23c. For example, a display control unit 22a of the terminal 20a displays an image on the monitor 71.

Attachment Support Function

The operation of the member attachment support system 100B will be described. For example, the worker 5A carries the heat insulating block 3a out from the storage 41. The worker 5B receives the heat insulating block 3a from the worker 5A. The worker 5B carries the heat insulating block 3a near the monitor 72, and causes the RFID reader (not illustrated) connected to the terminal 20b to read the attachment position information stored in the RFID tag 10a. The terminal 20b acquires the attachment position information from the RFID tag 10a and transmits the attachment position information to the server device 30.

Similarly, the worker 5C carries the heat insulating block 3b out from the storage 42. The worker 5D receives the heat insulating block 3b from the worker 5C and approaches the RFID reader (reading unit 21c) (not illustrated) connected to the terminal 20c near the monitor 73. Then, the terminal 20c acquires the attachment position information stored in the RFID tag 10b read by the RFID reader and transmits the information to the server device 30.

Subsequent processing is the same as in the first embodiment. For example, the server device 30 generates a support image in which the attachment positions of the heat insulating blocks 3a and 3b on the casing 1 are displayed and transmits the generated support image to the terminals 20a to 20c and the monitors 71 to 73. The terminals 20a, 20b, and 20c display the support image on the display screens of the respective terminals 20a, 20b, and 20c. The monitors 71, 72, and 73 display the support image. The worker 5B confirms the attachment position displayed on the monitor 72 and attaches the heat insulating block 3a to the attachment position 8a of the area a. The worker 5D confirms the attachment position displayed on the monitor 73 and attaches the heat insulating block 3b to the attachment position 8b of the area b.

Next, when the workers 5B and 5D attach the heat insulating blocks 3, information indicating that the attachment of the heat insulating blocks 3a and 3b is completed is input to the terminals 20a and 20b. Then, the terminals 20a and 20b notify the server device 30 of the attachment completion of the heat insulating blocks 3a and 3b along with the identification information of the respective terminals through the same processing as in the first embodiment. The server device 30 records the progress of the work and generates a support image reflecting the work status. The terminals 20a to 20c and the monitors 71 to 73 receive the support image reflecting the work status from the server device 30 and display the support image.

With the member attachment support system 100B of the present embodiment, the workers 5A to 5D can easily recognize the attachment positions of the heat insulating blocks 3 without wearing the armbands 6. With this, it is possible to obtain the same effects as in the first embodiment, such as a reduction in time of the attachment work of the heat insulating blocks 3 and improvement of work efficiency, with a simpler system configuration than in the first embodiment.

Third Embodiment

Hereinafter, a member attachment support system according to a third embodiment of the present disclosure will be described referring to FIGS. 8 to 15. In the configuration according to the third embodiment of the present disclosure, the same components as those of the member attachment support systems 100 to 100B according to the first embodiment and the second embodiment of the present disclosure are represented by the same reference signs, and description of the components will not be repeated. As described above, the member attachment support systems 100 to 100B provide the function of guiding the attachment position of the heat insulating blocks 3. In contrast, a member attachment support system 100C according to the third embodiment not only displays the attachment position of the heat insulating blocks 3, but also provides a function of storing and displaying the storage location of each detached heat insulating block 3. For example, during a periodic inspection, work of detaching the heat insulating blocks 3 from the casing 1 and attaching the heat insulating blocks 3 again after inspection is performed. With the function of displaying the storage location of the heat insulating block 3, it is possible to reduce effort of finding the heat insulating block 3 when the heat insulating block 3 is to be reattached to the casing 1 after inspection.

Figure 8:
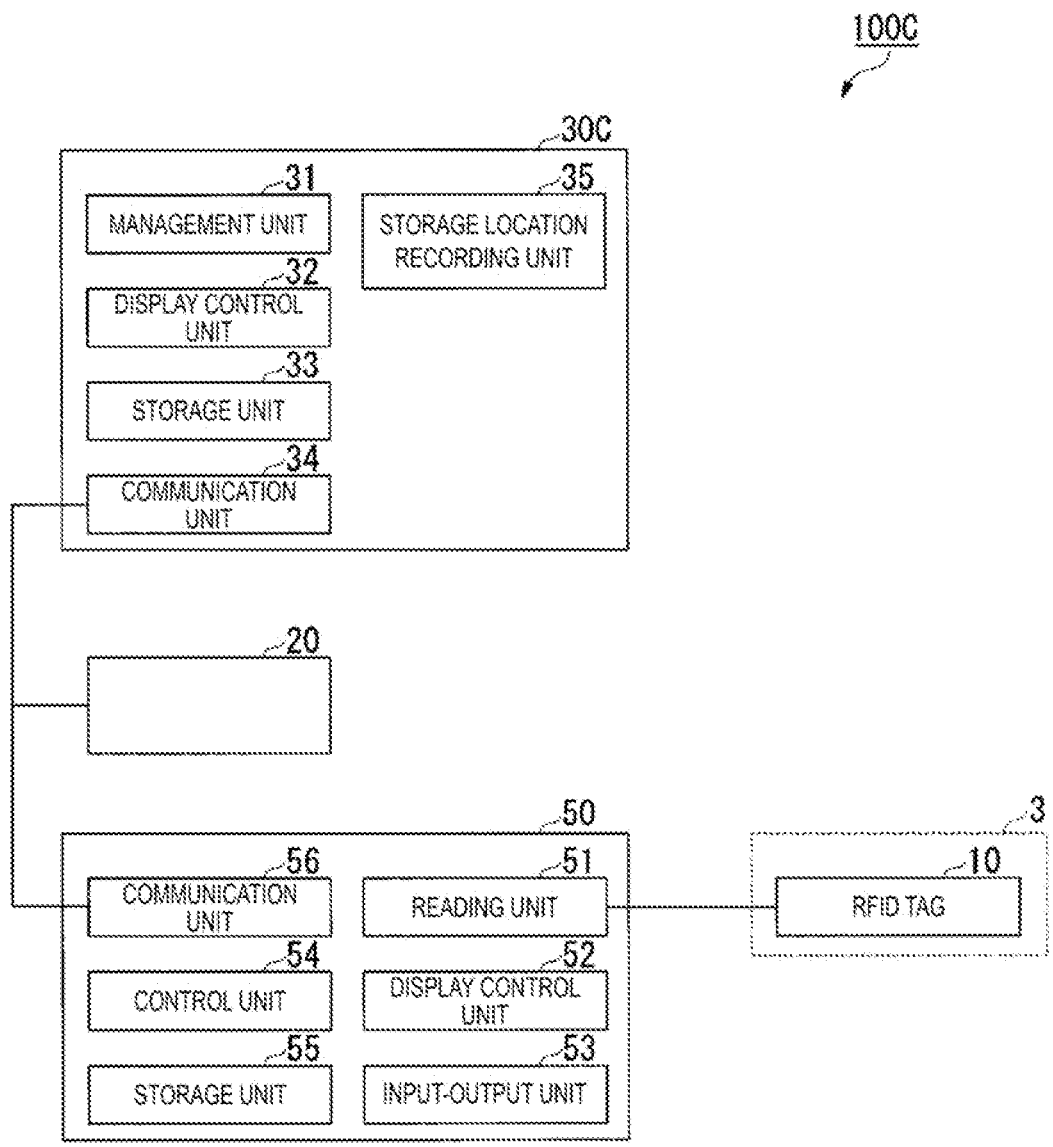
FIG. 8 is a block diagram illustrating an example of a member attachment support system in a third embodiment of the present disclosure.

FIG. 8 is a block diagram illustrating an example of the member attachment support system in the third embodiment of the present disclosure.

The member attachment support system 100C includes RFID tags 10 provided on the heat insulating blocks 3, terminals 20, terminals 50, and a server device 30C.

The RFID tags 10 and the terminals 20 are the same as those in the first embodiment and the second embodiment, and thus description of the RFID tags 10 and the terminals 20 will not be repeated.

The server device 30C includes the management unit 31, the display control unit 32, the storage unit 33, the communication unit 34, and a storage location recording unit 35.

The storage location recording unit 35 records a location where the worker 5 stores the heat insulating block 3 for each heat insulating block 3.

The terminal 50 includes a reading unit 51, a display control unit 52, an input-output unit 53, a control unit 54, a storage unit 55, and a communication unit 56. The terminal 50 is constituted of a mobile terminal, such as a smartphone, or a stationary computer, such as a PC.

The reading unit 51 communicates with the RFID tag 10 through wireless communication, such as Near Field Communication (NFC). The reading unit 51 acquires attachment position information stored in the RFID tag 10 through communication. The reading unit 51 may be an RFID reader or a barcode reader connected to the terminal 50.

The display control unit 52 generates an image to be displayed on the display screen of the terminal 50. For example, the display control unit 52 generates an image in which buttons used for storing and carrying out the heat insulating block, such as "activate", "start to store", "next" and the like, are displayed.

The input-output unit 53 performs an input and an output with respect to the terminal 50. For example, the input-output unit 53 includes a display screen provided in the terminal 50, hardware buttons provided on the terminal 50, a touch panel provided on the display screen, a monitor connected to the terminal 50, and a keyboard.

The control unit 54 controls the operation of the terminal 50 based on an operation performed by the worker 5 through the input-output unit 53. For example, in a case where the worker 5 depresses the "activate" button displayed on the display screen, the control unit 54 activates the reading unit 51. In a case where the worker 5 depresses the "start to store" button displayed on the display screen, the start of storage work of the heat insulating block 3 is transmitted to the server device 30C through the communication unit 56.

The storage unit 55 stores various kinds of information.

The communication unit 56 communicates with the server device 30C over a wireless local area network (LAN) or the like.

Hereinafter, functional units provided in a terminal 50A are described as a reading unit 51A, a display control unit 52A, an input-output unit 53A, a control unit 54A, a storage unit 55A, and a communication unit 56A. The same applies to a terminal 50C.

Figure 9:
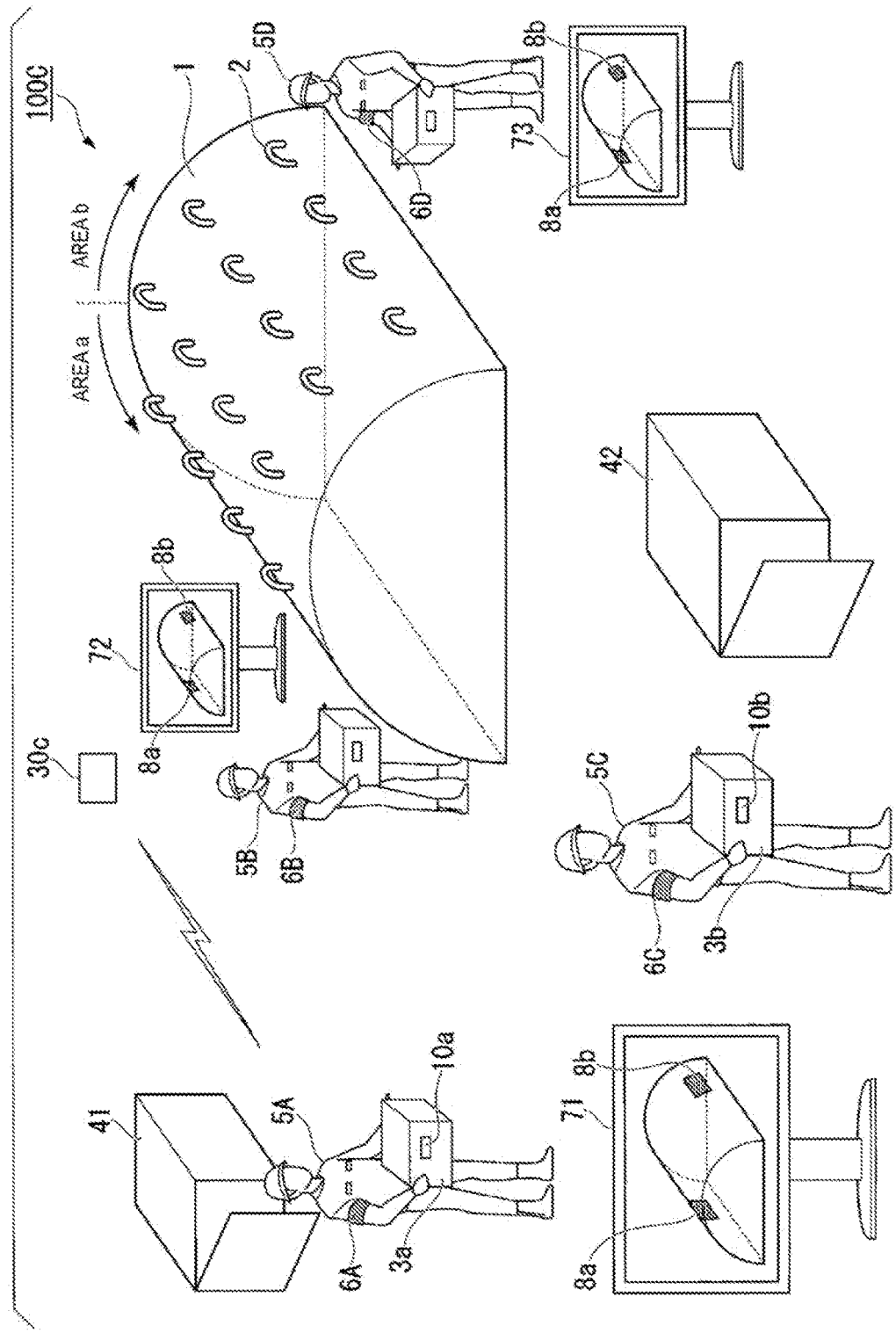
FIG. 9 is a first schematic view of the member attachment support system in the third embodiment of the present disclosure.

FIG. 9 is a first schematic view of the member attachment support system in the third embodiment of the present disclosure.

FIG. 9 illustrates the member attachment support system 100C of the present embodiment. Unlike the configuration of FIG. 1, the terminal 50A is provided on the armband 6A worn by the worker 5A, and the terminal 20B is provided on the armband 6B worn by the worker 5B. The terminal 50C is provided on the armband 6C worn by the worker 5C, and the terminal 20D is provided on the armband 6D worn by the worker 5D.

Recording of Storage Place

First, a situation where the heat insulating block 3 is detached will be described. For example, at the time of the start of a periodic inspection, the worker 5B detaches the heat insulating block 3*a* from the area a of the casing 1. The worker 5A receives the heat insulating block 3*a* from the worker 5B and stores the heat insulating block 3*a* in the storage 41. Similarly, the worker 5D detaches the heat insulating block 3*b* from the area b, and the worker 5C stores the heat insulating block 3*b* in the storage 42.

Figure 10:
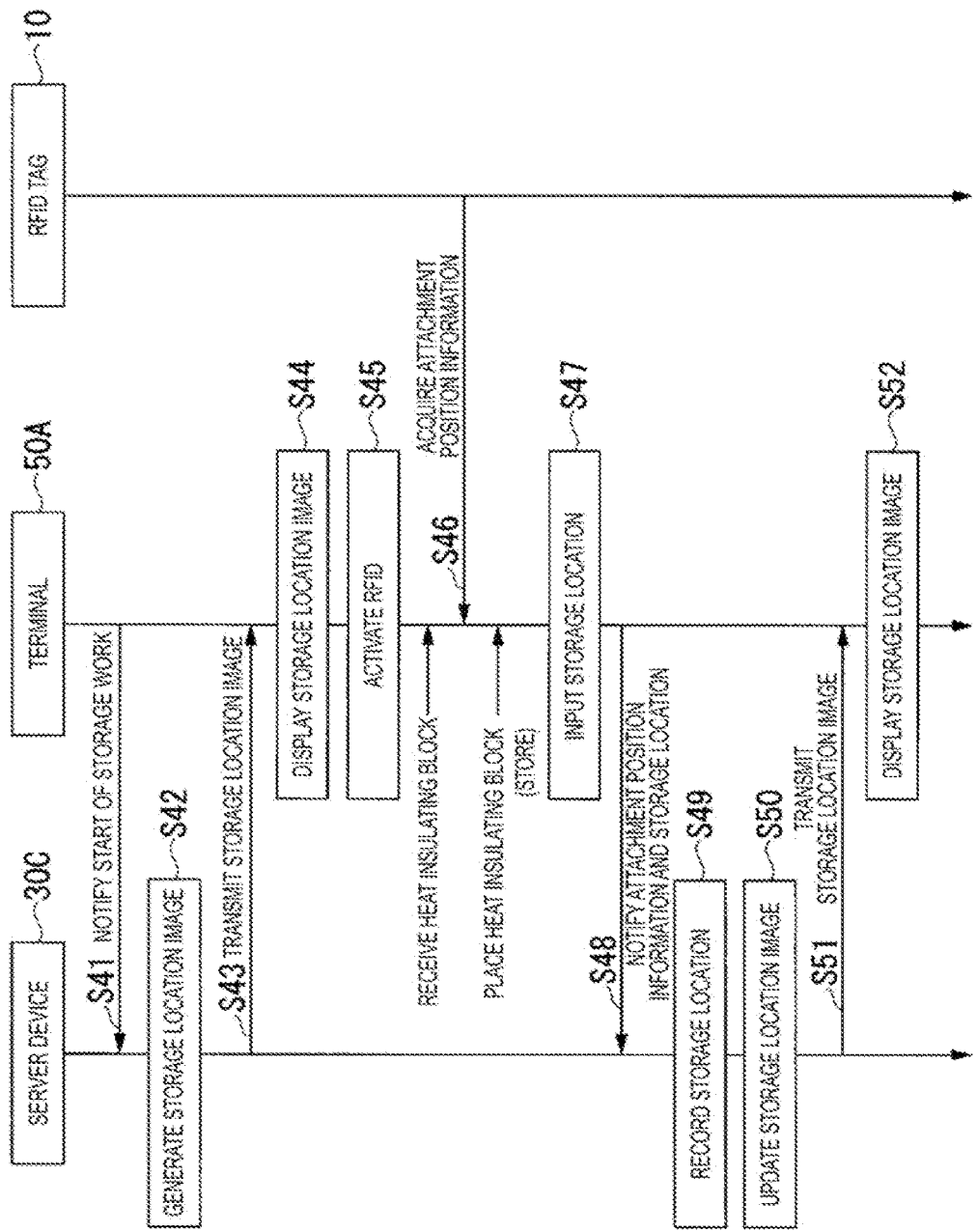
FIG. 10 is a flowchart illustrating an example of the operation of the member attachment support system at the time of storing the heat insulating block according to the third embodiment of the present disclosure.

FIG. 10 is a flowchart illustrating an example of the operation of the member attachment support system at the time of storing the heat insulating block according to the third embodiment of the present disclosure.

FIG. 11 is a diagram illustrating recording processing of the storage location of the heat insulating block according to the third embodiment of the present disclosure.

First, for example, the worker 5A depresses the "start to store" button displayed on the display screen of the terminal 50A to input information indicating the start of the storage work of the heat insulating block 3 to the terminal 50A. In the terminal 50A, the input-output unit 53A receives the input. The communication unit 56A notifies the server device 30C of the start of the storage work and the identification information of the terminal 50A (Step S41). In the server device 30C, the communication unit 34 receives the notification. The display control unit 32 generates a storage location image (Step S42). FIG. 11(*a*) illustrates an example of a storage location image. FIG. 11(*a*) is, for example, a plan view of the storage 41 and illustrates a state in which a floor of the storage 41 is divided into regions of a predetermined size and identification numbers, such as "P1" and "P2", are attached to the respective regions.

"P1" or the like is a location where one heat insulating block 3 is stored. The display control unit 32 generates the storage location image illustrated in FIG. 11(*a*), and the communication unit 34 transmits the storage location image to the terminal 50A (Step S43). In the terminal 50A, the communication unit 56A receives the storage location image, and the display control unit 52A displays the storage location image on the display screen of the terminal 50A (Step S44).

Furthermore, the worker 5A depresses the "activate" button on the display screen of the terminal 50A. Then, the control unit 54A activates the reading unit 51A (RFID function) (Step S45).

On the other hand, the worker 5B detaches the heat insulating block 3*a* from the casing 1 and delivers the heat insulating block 3*a* to the worker 5A. In this case, the reading unit 51A acquires the attachment position information from the RFID tag 10 of the received heat insulating block 3*a* (Step S46). In a situation where the heat insulating block 3*a* is stored, the attachment position information functions as identification information of the heat insulating block 3. The reading unit 51A outputs the acquired attachment position information to the control unit 54A.

The worker 5A carries the received heat insulating block 3a to the storage 41 and places (stores) the heat insulation block 3a any place in the storage. The worker 5A selects a storage location ("P1", "P2", or the like) corresponding to the position where the heat insulating block 3a is placed, in the storage location image displayed on the terminal 50A, and inputs the storage location of the heat insulating block 3a (Step S47). The input-output unit 53A receives this input and outputs information regarding the selected storage location to the control unit 54A. The control unit 54A transmits the attachment position information and information (such as "P1") regarding the storage location to the server device 30C along with the identification information of the terminal 50A through the communication unit 56A (Step S48).

In the server device 30C, the storage location recording unit 35 acquires the above-described information through the communication unit 34. The storage location recording unit 35 records the attachment position information (the identification information of the heat insulating block 3) and information regarding the storage location in the storage unit 33 in correspondence with each other (Step S49). FIG. 11(b) illustrates an example of a table in which information regarding the storage location is recorded. As illustrated in FIG. 11(b), the table stored in the storage unit 33 stores the attachment position information, the storage location information, and an attachment order in correspondence with one another. The attachment order is determined in advance for each piece of attachment position information. For example, as described referring to FIG. 5, it is known that work efficiency is improved in a case where the heat insulating blocks 3 are attached in such an order depending on the attachment positions. In the table of FIG. 11(b), for example, based on an order in which work efficiency is improved, numbers 1, 2, 3, . . . indicating the attachment order correspond to the heat insulating blocks 3 from the heat insulating block 3 to be attached first. In a case where the attachment position information and information regarding the storage location are transmitted from the terminal 50A, the storage location recording unit 35 stores the received information regarding the storage location in a "storage location information" field of a record having a value corresponding to the received attachment position information in an "attachment position information" field.

Next, the display control unit 32 updates the storage location image (Step S50). For example, in a case where "P1" is received as information regarding the storage location, the display control unit 32 generates a storage location image in which the position of "P1" is grayed out. The communication unit 34 transmits the updated storage location image to the terminal 50A (Step S51). In the terminal 50A, the communication unit 56A receives the updated storage location image, and the display control unit 52A displays the updated storage location image (Step S52). With this display, the worker 5A can confirm that the storage location of the heat insulating block 3 placed by the worker 5A is recorded.

The workers 5A and 5B repeat the same work until all heat insulating blocks 3 in the area a are detached and stored. Similarly, in regard to the area b, the work in which the worker 5D detaches the heat insulating block 3b and the worker 5C inputs the storage location of the heat insulating block 3b to the terminal 50C while storing the heat insulating block 3b in the storage 42 is repeated. The terminal 50C transmits the attachment position information and information regarding the storage location of the heat insulating block 3b to the server device 30C every time. In this manner, in a case where all heat insulating blocks 3 are detached from the casing 1 and stored, information regarding the storage locations of all heat insulating blocks 3 is recorded in the server device 30C.

Display of Storage Location

Next, the work of attaching the heat insulating blocks 3 to the casing 1 after inspection will be described. The worker 5A carries the heat insulating block 3 out from the storage 41 in a work order determined in advance and delivers the heat insulating block 3 to the worker 5B. The worker 5B attaches the received heat insulating block 3 to an appropriate attachment position of the area a. Similarly, the worker 5C carries the heat insulating block 3 out from the storage 42, and the worker 5D receives the heat insulating block 3 and attaches the heat insulating block 3 to an appropriate attachment position of the area b. The support for the attachment work performed by the workers 5B and 5D is the same as in the first embodiment.

Figure 12:
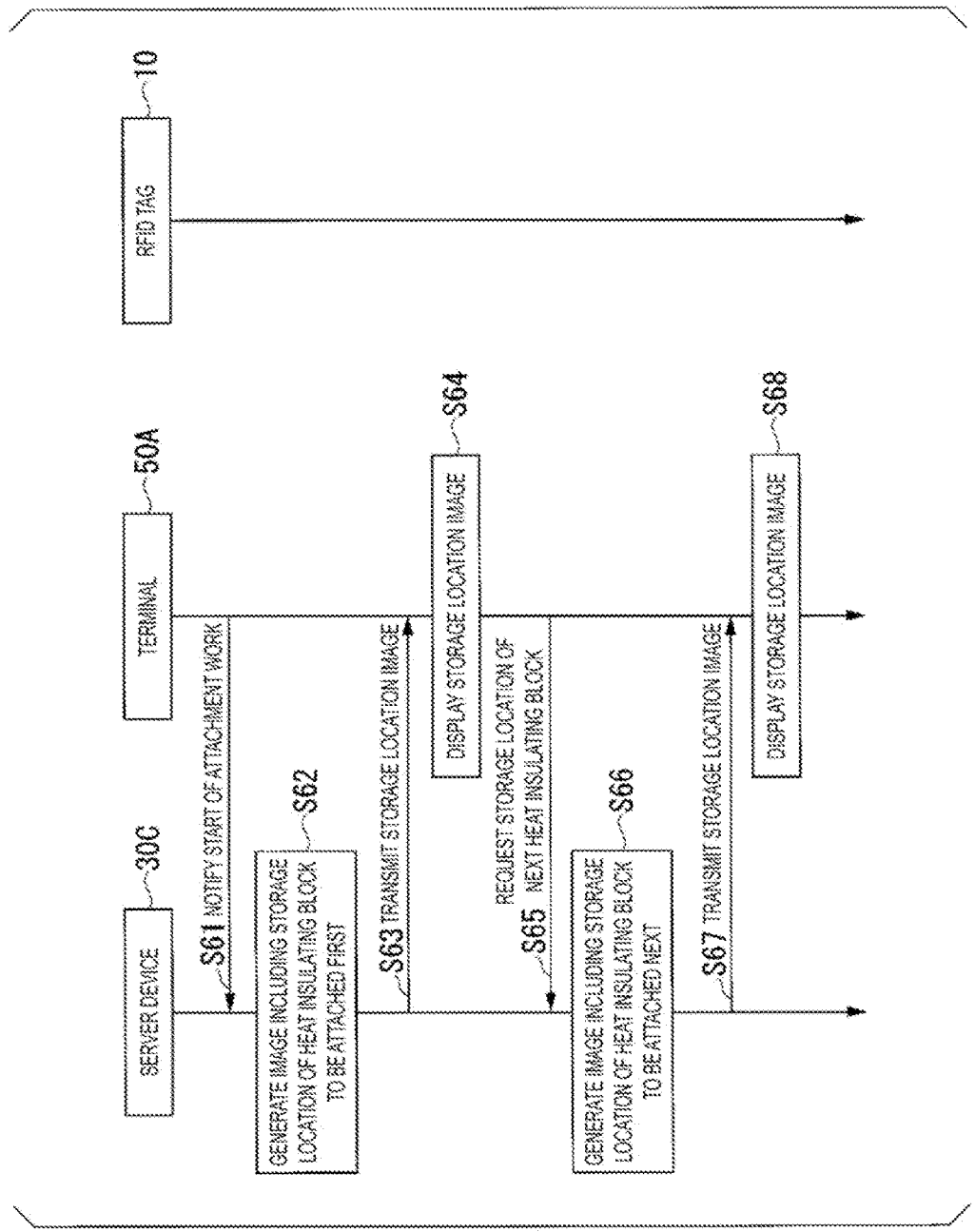
FIG. 12 is a flowchart illustrating an example of the operation of the member attachment support system at the time of carrying out the heat insulating block according to the third embodiment of the present disclosure.

FIG. 12 is a flowchart illustrating an example of the operation of the member attachment support system at the time of carrying out the heat insulating block according to the third embodiment of the present disclosure.

First, for example, the worker 5A depresses a "start to attach" button displayed on the display screen of the terminal 50A to input information indicating the start of the attachment work of the heat insulating block 3a to the terminal 50A. In the terminal 50A, the input-output unit 53A receives the input. The communication unit 56A notifies the server device 30C of the start of the attachment work and the identification information of the terminal 50A (Step S61). In the server device 30C, the communication unit 34 receives the notification. Then, the display control unit 32 generates a storage location image indicating the storage location of the heat insulating block 3 to be first attached (Step S62). Specifically, the display control unit 32 refers to data of the attachment order "1" from the table illustrated in FIG. 11(b) and reads out the attachment position information and the storage location information. For example, in a case where the heat insulating block 3 to be attached first is stored in "P8," the display control unit 32 generates an image in which only "P8" is displayed in a different form from other regions ("P1" and the like) in the storage location image illustrated in FIG. 11(a). For example, the display control unit 32 generates an image in which characters or a background of P8 is displayed in a different color from other regions or flashes to be highlighted. The communication unit 34 transmits the storage location image and the attachment position information (the identification information) of the heat insulating block 3 to be attached first to the terminal 50A (Step S63). In the terminal 50A, the communication unit 56A receives the storage location image, and the display control unit 52A displays the storage location image on the display screen of the terminal 50A (Step S64). The worker 5A carries the heat insulating block 3a out from a location corresponding to "P8" in the storage 41 with reference to the display of the storage place image and delivers the heat insulating block 3a to the worker 5B.

When the worker 5A carries the heat insulating block 3a out from the location corresponding to "P8", the reading unit 51A of the terminal 50A may be configured to read out the attachment position information from the RFID tag 10 of the heat insulating block 3a, collate the attachment position information with the attachment position information acquired from the server device 30C, and in a case where information is not coincident, display an error message.

As in the first embodiment, the worker 5B that receives the heat insulating block 3a reads the attachment position information of the heat insulating block 3a using the terminal 20B and causes the attachment position to be displayed on the display screen of the terminal 20B, the monitor 72, or the like. The worker 5B attaches the heat insulating block 3 while referring to the attachment position displayed on the monitor 72 or the like.

On the other hand, in a case where the heat insulating block 3a to be attached first is delivered to the worker 5B, for example, the worker 5A depresses the "next" button displayed on the display screen of the terminal 50A to input information requesting the storage location of the heat insulating block 3 to be next attached to the terminal 50A. The input-output unit 53A receives this input, and the communication unit 56A notifies the server device 30C of the information requesting the storage location of the next heat insulating block 3 and the identification information of the terminal 50A (Step S65). In the server device 30C, the communication unit 34 receives this notification, and the display control unit 32 generates a storage location image indicating the storage location of the heat insulating block 3 to be next attached (Step S66). Specifically, the display control unit 32 specifies a record of the attachment order "2" with reference to the table of FIG. 11(b) and reads out the attachment position information and the storage location information. Then, the display control unit 32 generates a storage location image in which the next storage location is highlighted. The communication unit 34 transmits the storage location image and the attachment position information of the heat insulating block to be next attached to the terminal 50A (Step S67). In the terminal 50A, the communication unit 56A receives the storage location image, and the display control unit 52A displays the storage location image on the display screen (Step S68). The worker 5A carries out the heat insulating block 3 to be next attached with reference to the display of the storage location image and delivers the heat insulating block 3 to the worker 5B.

In this manner, the workers 5A and 5B repeat the same work until all heat insulating blocks 3a in the area a are attached. Similarly, in regard to the area b, the server device 30C notifies the terminal 50C, which is worn by the worker 5C, of the storage location of the heat insulating block 3b in the attachment order, and the worker 5C carries the heat insulating block 3b out from the storage 42 in compliance with the guide. The worker 5D repeats the work of receiving the heat insulating block 3 from the worker 5C and attaching the heat insulating block 3 to the area b by using the terminal 20D.

According to the present embodiment, since the worker 5 can confirm the storage location of the heat insulating block 3 to be next attached, the worker 5 can find the heat insulating block 3 to be next attached without hesitation. With this configuration, it is possible to improve the efficiency of the attachment work of the heat insulating blocks 3. The worker 5 can store the heat insulating blocks 3 detached from the casing 1 at any location without arranging the heat insulating blocks 3 in the attachment order as illustrated in FIG. 5.

In the above description, although the workers 5A and 5C who store or carry out the heat insulating block 3 and the workers 5B and 5D who detach and attach the heat insulating block 3 cooperate to perform work, one worker 5 may perform a series of works of detaching, storing, carrying out, and attaching the heat insulating block 3. In such a case, for example, the functions in the terminal 50 may be implemented in the terminal 20, and the worker 5 may wear the armband 6 on which the terminal 20 is provided.

In the above description, although the storage location of the heat insulating block 3 is input to the terminal 50 each time the heat insulating block 3 is stored, that is, storage and reading and the input of the storage location are performed as a set, the present disclosure is not limited to the configuration. For example, the reading and input of the storage location may be performed collectively after all heat insulating blocks 3 are stored. Specifically, a specific worker 5 (for example, the worker 5A) may read the attachment position information one by one using the terminal 50A and may record the storage location one by one for all heat insulating blocks 3 placed in the storages 41 and 42. With this, the worker 5 who performs the storage work of the heat insulating block 3 may not perform the work of recording the storage location.

In the configuration example of FIG. 9, although the terminal 20 and the terminal 50 are provided on the armband 6 of the worker 5, the third embodiment can be combined with the second embodiment.

Figure 13:
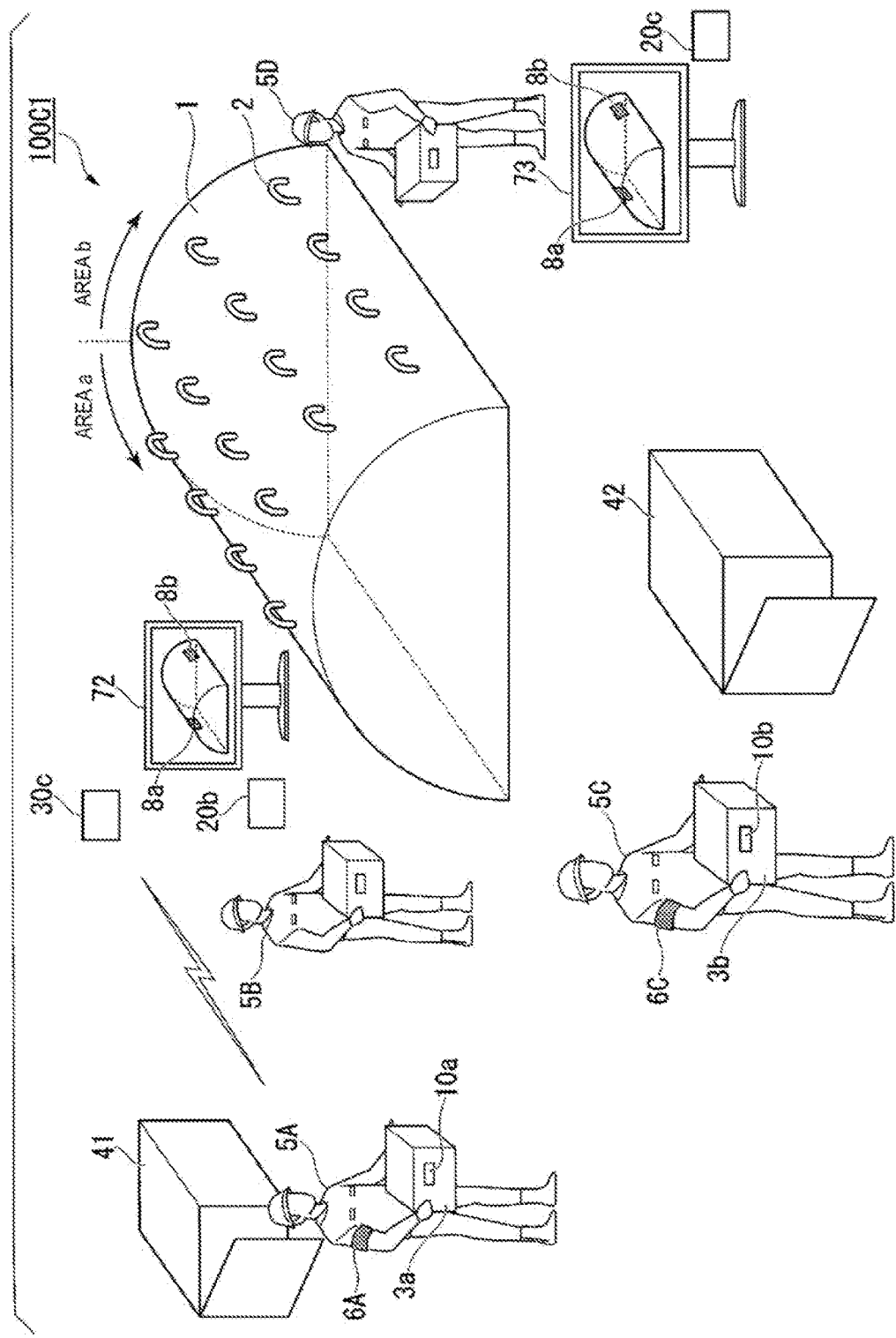
FIG. 13 is a second schematic view of the member attachment support system in the third embodiment of the present disclosure.

FIG. 13 is a second schematic view of the member attachment support system in the third embodiment of the present disclosure. In a member attachment support system 100C1 illustrated in FIG. 13, unlike the configuration of FIG. 9, the terminal 50A is provided on the armband 6A worn by the worker 5A, and the worker 5B does not wear an armband 6. The terminal 50C is provided on the armband 6C worn by the worker 5C, and the worker 5D does not wear an armband 6. In such a configuration, the worker 5A stores and carries out the heat insulating block 3a while operating the terminal 50A. The worker 5B carries the heat insulating block 3a received from the worker 5A, for example, to the terminal 20b, causes the reading unit 21b to read the RFID tag 10, and attaches the heat insulating block 3a to the appropriate position on the casing 1 with reference to the attachment position displayed on the monitor 72. The same applies to the workers 5C and 5D.

For example, there is an experienced worker who, after confirming the attachment position with reference to the monitors 72 and 73, can then attach the heating insulating block to a correct position later. According to the configuration illustrated in FIG. 13, the workers 5B and 5D can perform the attachment work with light equipment without wearing the armband 6. It is possible to suppress the cost of the member attachment support system 100C1.

In contrast to the configuration example of FIG. 13, a configuration in which the terminal 50 is stationary is also possible.

Figure 14:
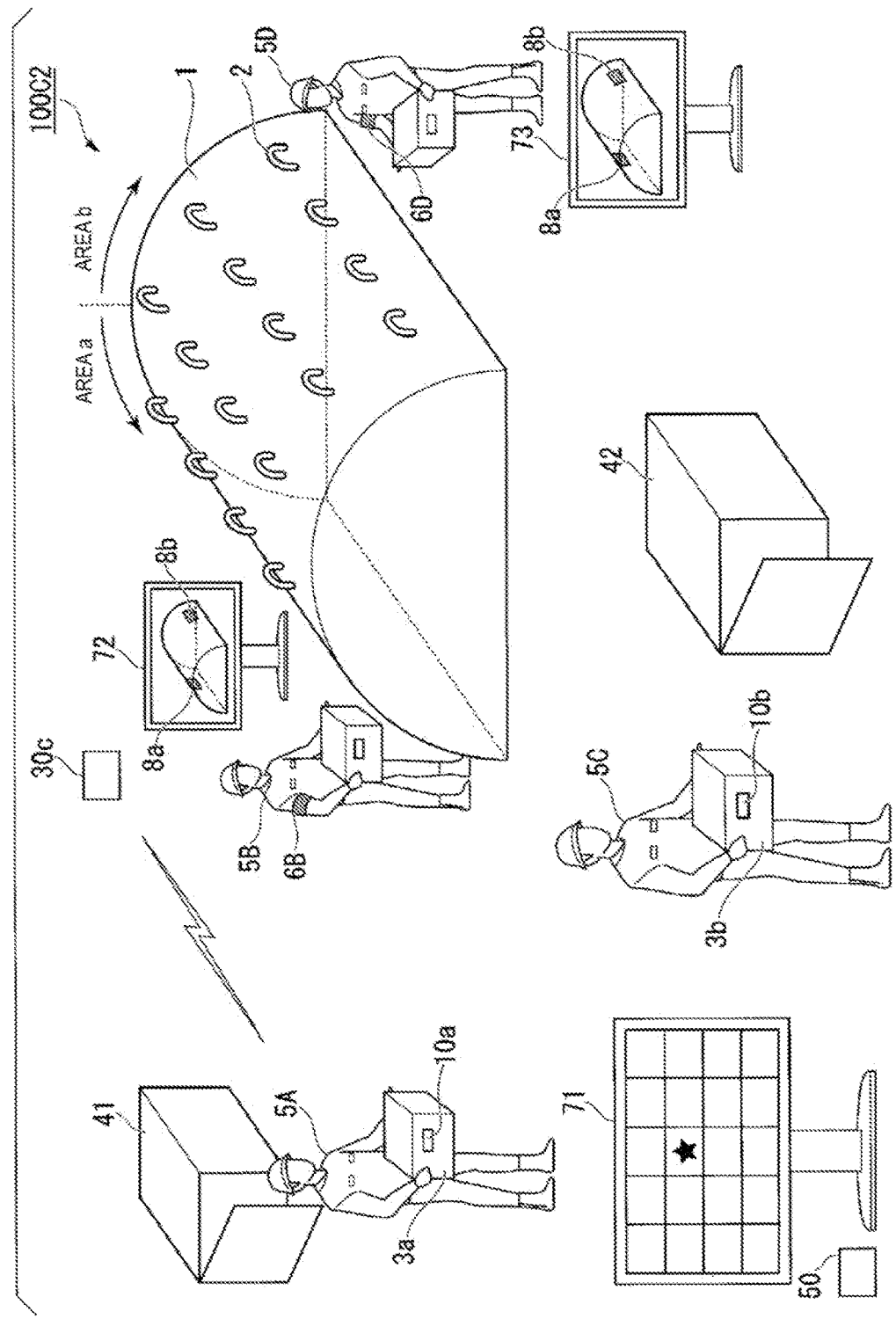
FIG. 14 is a third schematic view of the member attachment support system in the third embodiment of the present disclosure.

FIG. 14 is a third schematic view of the member attachment support system in the third embodiment of the present disclosure. In a member attachment support system 100C2 illustrated in FIG. 14, unlike the configuration of FIG. 13, the worker 5A does not wear an armband 6, and the worker 5B wears the armband 6B on which the terminal 20B is provided. The worker 5C does not wear an armband 6, and the worker 5D wears the armband 6D on which the terminal 20C is provided. The terminal 50 is provided to be fixed near the monitor 71, and the workers 5A and 5C hold the heat insulating blocks 3, move to a position where the terminal 50 is provided, and cause the RFID reader or the like (reading unit 51) connected to the terminal 50 to read the attachment position information. In addition, the storage location image of the storage 41 and the storage location image of the storage 42 are switched, and the workers 5A and 5C input planned storage locations of the heat insulating blocks 3 instantaneously. Then, the workers 5A and 5C store the heat insulating blocks 3 at the planned storage locations of the storages 41 and 42 input by the individual workers 5A and 5C. Alternatively, the workers 5A and 5C may store the heat insulating blocks 3 after the RFID reader reads the attachment position information and may input actual storage locations to the terminal 50 after storage. In a situation where the heat insulating block is to be attached, the worker 5A carries out the heat insulating block 3a while confirming the storage location displayed on the monitor 71. The worker 5B causes the terminal 20B to read the RFID tag 10 for the heat insulating block 3a received from the worker 5A. The worker 5B attaches the heat insulating block 3a to the appropriate position on the casing 1 with reference to the attachment position displayed on the display screen of the terminal 20B. The same applies to the workers 5C and 5D. Next, as illustrated in FIG. 15, the terminal 50 and the monitor may be provided for each of the storage 41 and the storage 42.

According to the configuration illustrated in FIG. 14, for example, in which a plurality of workers 5 cooperatively store the heat insulating blocks 3 in the storage 41, the workers can refer to the storage location image of the monitor 71 and can work while discussing where to store the next heat insulating block 3.

Note that both the terminal 20 and the terminal 50 may be stationary.

Figure 15:
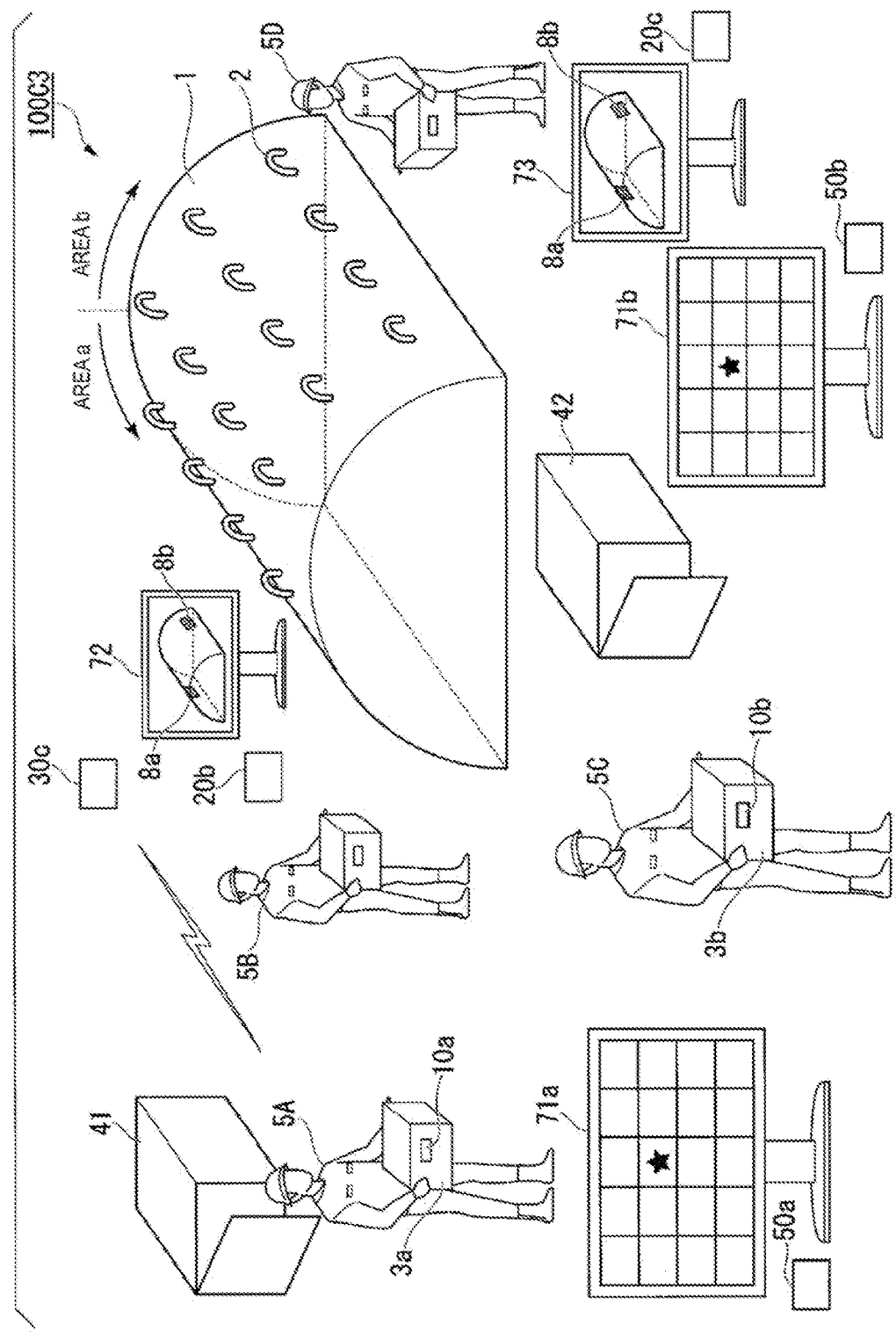
FIG. 15 is a fourth schematic view of the member attachment support system in the third embodiment of the present disclosure.

FIG. 15 is a fourth schematic view of the member attachment support system in the third embodiment of the present disclosure. In a member attachment support system 100C3 illustrated in FIG. 15, the workers 5A to 5D do not wear the armbands 6, terminals 50a and 50b are provided to be fixed near monitors 71a and 71b, and the terminals 20b and 20c are provided to be fixed near the monitors 72 and 73.

The worker 5A holds the heat insulating block 3a, moves to a position where the terminal 50a is provided, and causes the attachment position information to be read to perform the storage work. Furthermore, the worker 5A carries out the heat insulating block 3a in the attachment order based on the display of the monitor 71a. Then, the worker 5B receives the heat insulating block 3a carried out by the worker 5A, moves to a position where the terminal 20b is provided, causes the attachment position information to be read, and causes the attachment position of the heat insulating block 3a to be displayed on the monitor 72.

Similarly, the worker 5C stores and carries out the heat insulating block 3b using the terminal 50b and the monitor 71b. The worker 5D performs the attachment work using the terminal 20c and the monitor 73.

According to the configuration illustrated in FIG. 15, it is possible to introduce and operate the system simply and at low cost compared to the configurations illustrated in FIGS. 9, 13, and 14.

Although a configuration in which the server device 30 is not provided is described in the first embodiment (FIG. 6), in the third embodiment, the terminal 20 may have the configuration illustrated in FIG. 6, the storage location recording unit 35 of the server device 30C, the function of generating the storage location image of the display control unit 32, and the table of the storage unit 33 may be implemented by the terminal 50, and the server device 30C may not be provided.

In the third embodiment, both the functions of the terminal 20 and the functions of the terminal 50 may be implemented by one terminal device, and the terminal device may be provided on the armband 6 or may be provided near the monitor 71.

In the first to third embodiments described above, although the RFID tag 10 in which the attachment position information is stored is attached to the heat insulating block 3, a label or the like displaying code information (barcode, QR code (Registered Trademark), or the like) indicating the attachment position information may be applied to the surface of the heat insulating block 3 instead of the RFID tag 10. In this case, an application for reading the code information is installed on the terminal 20 and the terminal 50, or a code reading device (barcode reader or the like) is attached to the terminal 20 and the terminal 50 to reach the attachment position information.

In the above description of the first to third embodiments, although an example is given where the worker wears the armband 6 on which the terminal 20 or the terminal 50 is provided, the support image output from the terminal 20 or the storage location image output from the terminal 50 may be displayed on an eyeglass type display. Alternatively, the functions of the terminal 20 or the terminal 50 may be implemented by an eyeglass type wearable terminal. In a case where an augmented reality technique is applied, for example, in the case of a support image, the attachment position of the heat insulating block 3 may be displayed on the actual casing 1 in a superimposed manner. With the use of the eyeglass type display or the like, work efficiency can be improved because both hands can be freely used.

In the above-described embodiments, the attachment position of the heat insulating block 3 is displayed by the display of the support image, and the storage location of the heat insulating block 3 to be next attached is displayed by the storage location image, but the attachment position and the storage location may be guided by sound. For example, in the configuration of FIG. 9, a speaker connected to (or incorporated in) the terminal 50A of the armband 6A guides the storage location by sound, and the worker 5A carries the heat insulating block 3a out from the guided place and delivers the heat insulating block 3a to the worker 5B. The worker 5B causes the attachment position information stored in the RFID tag 10a to be read using the RFID reader connected to the terminal 20B of the armband 6B. Then, the speaker incorporated in (or connected to) the terminal 20B guides the attachment position (area information and partition information) of the heat insulating block 3a by sound. With the sound guide, the worker 5A can carry out the heat insulating block 3a without referring to the monitor 71 or the like. The worker 5B can perform the attachment work of the heat insulating block 3a without referring to the monitor 72 or the like.

The terminal 20, the server device 30, and the terminal 50 are implemented in a computer including, for example, a processor, such as a central processing unit (CPU), a main storage device, an auxiliary storage device, an input/output interface, and a communication interface. In this configuration, the operations of the respective functional units described above are stored in the auxiliary storage device in a format of a program. The CPU reads the program from the auxiliary storage device, deploys the program to the main storage device, and executes the above-described processing in compliance with the program. The CPU secures a storage area in the main storage device in compliance with the program. The CPU secures a storage area for storing data during processing in the auxiliary storage device in compliance with the program.

In addition, the constituent elements in the embodiments as described above can be replaced as appropriate with commonly known constituent elements, to the extent that it does not depart from the intention of the present disclosure. Also, the technical scope of the present disclosure is not limited to the embodiments described above, and various modifications may be further made without departing from the spirit of the present disclosure.

For example, a device to which the member attachment support system of the present embodiment is applied is not limited to a high-temperature device constituting a gas turbine. The RFID tag 10 or the label on which the code information is displayed is an example of an identification information storage unit. The terminal 20 and the terminal 50 to which the RFID reader or the barcode reader is connected are examples of a terminal device. The monitors 71 to 73 and the display screen of the terminal 20 are examples of a display device. The storage unit 33 that stores the table illustrated in FIG. 11(b) is an example of a storage location storage unit. A speaker connected to or embedded in the terminal 20 or a speaker connected to or embedded in the terminal 50 is an example of a sound output device.

In the above-described embodiments, although the attachment position information includes the area information and the partition information, since the workers 5A and 5C need not know the partition information, only the area information may be transmitted from the RFID tag 10a and 10b to the terminals 20A and 20C carried by the workers 5A and 5C. Then, only the area information may be displayed on the monitor 71 and the display devices of the terminal 20A and 20C that are referred to by the workers 5A and 5C. Only the partition information may be transmitted from the RFID tags 10a and 10b to the terminals 20B and 20D carried by the workers 5B and 5D. Then, only the partition information may be displayed on the monitors 72 and 73 and the display devices of the terminals 20B and 20D that are referred to by the workers 5B and 5D. Alternatively, the area information and the partition information may be transmitted from the RFID tags 10a and 10b to the terminals 20B and 20D carried by the workers 5B and 5D.

INDUSTRIAL APPLICABILITY

With the member attachment support system and the member attachment support method described above, it is possible to improve the efficiency of work of attaching a heat insulating member to a device.

REFERENCE SIGNS LIST

1 Casing
2 Tool
3, 3a, 3b Heat insulating block
5, 5A, 5B, 5C, 5D Worker
6, 6A, 6B, 6C, 6D Armband
8, 8a, 8b Attachment position
10, 10a, 10b RFID tag
20, 20A, 20B, 20a, 20b, 20c Terminal
21, 21A, 21B Reading unit
22, 22A, 22B Display control unit
23, 23A, 23B Input-output unit
24, 24A, 24B Control unit
25, 25A, 25B Storage unit
26, 26A, 26B Communication unit
27A, 27B Management unit
30 Server device
31 Management unit
32 Display control unit
33 Storage unit
34 Communication unit
41, 42 Storage
50, 50A, 50B Terminal
51, 51A Reading unit
52, 52A Display control unit
53, 53A Input-output unit
54, 54A Control unit
55, 55A Storage unit
56, 56A Communication unit
71, 72, 73 Monitor
100, 100A Member attachment support system

The invention claimed is:

1. A member attachment support system for supporting work of attaching a plurality of members to a device, the member attachment support system comprising:
an identifier provided for each of the plurality of members and configured to store identification information associated with an attachment position of each of the plurality of members;
a first processor configured to acquire the identification information from the identifier; and
a second processor configured to record to a memory that each of the plurality of members is attached to the attachment position corresponding to the identification information; and
a display,
wherein the first processor or the second processor is configured to: (i) generate a support image indicating the attachment position on the device corresponding to the identification information; and (ii) instruct the display to show the support image and a latest progress of the work based on the record of the memory.

2. The member attachment support system according to claim 1, wherein the identification information includes area information indicating a work area on the device.

3. The member attachment support system according to claim 2, wherein the identification information includes partition information which is information of a section of the attachment position of the member uniquely set in the work area.

4. The member attachment support system according to claim 2, wherein the first processor or the second processor is configured to instruct the display to show the attachment position on the device in a different form depending on the work area.

5. The member attachment support system according to claim 1, wherein:
the first processor or the second processor is configured to instruct the display to show the support image in: (i) a first form for the attachment position of the plurality of members before attachment; and (ii) a second form for the attachment position of the plurality of members after the attachment is completed; and
the first form is different from the second form.

6. The member attachment support system according to claim 1, further comprising:
a plurality of the identifiers,
wherein the second processor is a server configured to instruct the display to show the support image and the latest progress of the work to a plurality of workers simultaneously.

7. The member attachment support system according to claim 1, further comprising:
a plurality of the identifiers; and
a plurality of the first processors which are included in a plurality of terminals, respectively,
wherein at least one of the plurality of the terminals is configured to generate the support image and transmit the support image to a remainder of the plurality of the terminals.

8. The member attachment support system according to claim 1, wherein:
the memory is a first memory;
the member attachment support system further comprises a second memory configured to store a storage location of the plurality of members before attachment to the device; and
the first processor or the second processor is configured to instruct the display to show the storage location.

9. The member attachment support system according to claim 1, wherein the identifier is a radio frequency identifier (RFID) tag.

10. The member attachment support system according to claim 1, wherein the identifier is configured to have code information displayed thereon.

11. The member attachment support system according to claim 1, wherein the device is a gas turbine component and the plurality of members are heat insulation members.

12. The member attachment support system according to claim 11, wherein the gas turbine component is a compressor, a combustor or a turbine; and the heat insulation members are heat insulations blocks.

13. A member attachment support system for supporting work of attaching a plurality of members to a device, the member attachment support system comprising:
an identifier provided for each of the plurality of members and configured to store identification information associated with an attachment position of each of the plurality of members;
a first processor configured to acquire the identification information from the identifier;
a speaker configured to output sound information indicating the attachment position on the device corresponding to the identification information acquired by the first processor;
a second processor configured to record to a memory that each of the plurality of members is attached to the attachment position corresponding to the identification information; and
a display,
wherein the first processor or the second processor is configured to: (i) generate a support image indicating the attachment position on the device corresponding to the identification information; and (ii) instruct the display to show the support image and a latest progress of the work based on the record of the memory.

14. The member attachment support system according to claim 13, wherein the device is a gas turbine component and the plurality of members are heat insulation members.

15. The member attachment support system according to claim 14, wherein the gas turbine component is a compressor, a combustor or a turbine; and the heat insulation members are heat insulations blocks.

16. A member attachment support method, using the member attachment support system according to claim 1, for supporting the work of attaching the plurality of members to the device, the member attachment support method comprising:
acquiring, at the first processor, the identification information associated with the attachment position of each of the plurality of members from the identifier provided for each of the plurality of members and configured to store the identification information;
instructing, by the first processor, the display to show the support image indicating the attachment position on the device corresponding to the identification information acquired by the first processor;
recording, by the second processor to the memory, that each of the plurality of members is attached to the attachment position corresponding to the identification information; and
(i) generating, by the first processor or the second processor, the support image indicating the attachment position on the device corresponding to the identification information; and (ii) instructing, by the first processor or the second processor, the display to show the support image and the latest progress of the work based on the record of the memory.

17. The member attachment support method according to claim 16, wherein the device is a gas turbine component and the plurality of members are heat insulation members.

18. The member attachment support method according to claim 17, wherein the gas turbine component is a compressor, a combustor or a turbine; and the heat insulation members are heat insulations blocks.

* * * * *